US012806774B2

(12) United States Patent
Webb

(10) Patent No.: US 12,806,774 B2
(45) Date of Patent: Nov. 24, 2026

(54) CLUTCH FOR AN ACTUATOR FOR A HUMANOID ROBOT

(71) Applicant: Figure AI Inc., Sunnyvale, CA (US)

(72) Inventor: Jacob Webb, Sunnyvale, CA (US)

(73) Assignee: FIGURE AI INC., San Jose, CA (US)

( * ) Notice: Subject to any disclaimer, the term of this patent is extended or adjusted under 35 U.S.C. 154(b) by 108 days.

(21) Appl. No.: 19/040,860

(22) Filed: Jan. 29, 2025

(65) Prior Publication Data

US 2026/0070216 A1 Mar. 12, 2026

Related U.S. Application Data

(60) Provisional application No. 63/626,085, filed on Jan. 29, 2024.

(51) Int. Cl.

*B25J 9/16* (2006.01)
*B25J 9/00* (2006.01)
*B25J 9/10* (2006.01)
*B25J 9/12* (2006.01)

(52) U.S. Cl.

CPC ........... *B25J 9/1633* (2013.01); *B25J 9/0009* (2013.01); *B25J 9/102* (2013.01); *B25J 9/126* (2013.01); *B25J 9/1674* (2013.01)

(58) Field of Classification Search

CPC ........ B25J 9/1633; B25J 9/0009; B25J 9/102; B25J 9/126; B25J 9/1674

See application file for complete search history.

(56) References Cited

U.S. PATENT DOCUMENTS

| | | | |
|---|---|---|---|
| 552,557 | A | 1/1896 | Weber |
| 1,290,140 | A | 1/1919 | Elleby |
| 2,362,597 | A | 11/1944 | Vince |
| 3,010,223 | A | 11/1961 | Alderson |
| 3,060,445 | A | 10/1962 | Brockman |

(Continued)

FOREIGN PATENT DOCUMENTS

| | | |
|---|---|---|
| AU | 202413544 | 7/2024 |
| CA | 137209 | 5/2011 |

(Continued)

OTHER PUBLICATIONS

CyberOne ROBOTS_ Your Guide to the World of Robotics (Year: 2022).

(Continued)

*Primary Examiner* — Farhana Pervin

(57) ABSTRACT

A torque protection apparatus comprising: a gearbox coupled to an axle; an output ring with first and second planar disc surfaces coupled to the gearbox output; an outer body surrounding these components; an output adaptor attached to the outer body; an inner body within the outer body; a first clutch friction plate between the output adaptor and first planar disc surface; fluid in a chamber between the inner body and outer body; and a hydraulic pressure mechanism. The pressurized fluid pushes the inner body toward the output ring, pressing the output ring against the clutch friction plate. This creates friction causing the outer body to rotate with the axle until rotational torque exceeds a predetermined threshold, at which point the clutch friction plate slides against the disc surface, protecting the gearbox from excessive torque.

20 Claims, 7 Drawing Sheets

(56) References Cited

U.S. PATENT DOCUMENTS

| | | | |
|---|---|---|---|
| 3,458,864 | A | 8/1969 | Austin |
| D246,201 | S | 10/1977 | Ogawa |
| D251,627 | S | 4/1979 | Mcquarrie |
| D255,283 | S | 6/1980 | Piche |
| 4,678,952 | A | 7/1987 | Peterson |
| 4,804,220 | A | 2/1989 | Rosheim |
| 4,834,761 | A | 5/1989 | Walters |
| 4,986,723 | A | 1/1991 | Maeda |
| D314,465 | S | 2/1991 | Campbell |
| D332,514 | S | 1/1993 | Brandoff |
| 5,394,766 | A | 3/1995 | Johnson |
| 5,447,403 | A | 9/1995 | Engler, Jr. |
| 5,673,367 | A | 9/1997 | Buckley |
| D389,803 | S | 1/1998 | Nishio |
| 5,985,483 | A | 11/1999 | Verhoog |
| D418,276 | S | 1/2000 | Bengtsson |
| D421,329 | S | 3/2000 | Adams |
| 6,269,702 | B1 | 8/2001 | Lambson |
| 6,477,058 | B1 | 11/2002 | Luebs |
| 6,538,410 | B2 | 3/2003 | Mori |
| D476,404 | S | 6/2003 | Chen |
| 6,732,015 | B2 | 5/2004 | Maeda |
| D502,924 | S | 3/2005 | Sirichai |
| 6,901,313 | B2 | 5/2005 | Mori |
| D505,918 | S | 6/2005 | Conway |
| 6,980,889 | B2 | 12/2005 | Ito |
| 7,024,276 | B2 | 4/2006 | Ito |
| 7,031,806 | B2 | 4/2006 | Kuroki |
| 7,054,718 | B2 | 5/2006 | Miyamoto |
| 7,072,741 | B2 | 7/2006 | Nagashima |
| D526,467 | S | 8/2006 | Kent |
| 7,099,747 | B2 | 8/2006 | Mikami |
| D528,507 | S | 9/2006 | Brown |
| 7,113,849 | B2 | 9/2006 | Kuroki |
| D536,010 | S | 1/2007 | Takahashi |
| D536,859 | S | 2/2007 | Carreras |
| D541,353 | S | 4/2007 | Takahashi |
| 7,230,402 | B2 | 6/2007 | Kumagai |
| D550,735 | S | 9/2007 | Takahashi |
| D555,878 | S | 11/2007 | Bay |
| 7,308,336 | B2 | 12/2007 | Takenaka |
| 7,319,918 | B2 | 1/2008 | Takenaka |
| 7,330,775 | B2 | 2/2008 | Orita |
| 7,337,040 | B2 | 2/2008 | Takenaka |
| 7,379,789 | B2 | 5/2008 | Takenaka |
| 7,386,364 | B2 | 6/2008 | Mikami |
| 7,386,366 | B2 | 6/2008 | Dariush |
| D574,404 | S | 8/2008 | Maisonnier |
| D580,874 | S | 11/2008 | Amidon |
| D588,783 | S | 3/2009 | Olstorn |
| 7,664,569 | B2 | 2/2010 | Shimizu |
| D620,231 | S | 7/2010 | Parker |
| D622,332 | S | 8/2010 | Pence |
| D628,609 | S | 12/2010 | Linn |
| D631,612 | S | 1/2011 | Tajima |
| 7,864,159 | B2 | 1/2011 | Sweetser |
| D639,023 | S | 6/2011 | Iamartino |
| D639,025 | S | 6/2011 | Holder |
| D641,137 | S | 7/2011 | Evans |
| D641,808 | S | 7/2011 | Matsuda |
| D663,101 | S | 7/2012 | Best |
| 8,224,652 | B2 | 7/2012 | Wang |
| D668,758 | S | 10/2012 | Hall |
| D675,784 | S | 2/2013 | Riahi |
| D677,743 | S | 3/2013 | Koshiishi |
| D685,158 | S | 7/2013 | Lambertz |
| D687,619 | S | 8/2013 | Savage |
| D687,908 | S | 8/2013 | Hoang |
| 8,511,964 | B2 | 8/2013 | Linn |
| D689,566 | S | 9/2013 | Wong |
| 8,600,550 | B2 | 12/2013 | Kurzweil |
| D698,524 | S | 2/2014 | Roberts |
| D698,525 | S | 2/2014 | Roberts |
| D698,527 | S | 2/2014 | Roberts |
| D698,730 | S | 2/2014 | Hori |
| 8,660,695 | B2 | 2/2014 | De La Rosa Tames |
| 8,706,299 | B2 | 4/2014 | Sanders |
| 8,770,749 | B2 | 7/2014 | Mccabe |
| D712,598 | S | 9/2014 | Mehra |
| D712,983 | S | 9/2014 | Gan |
| D714,525 | S | 10/2014 | Payne |
| D717,246 | S | 11/2014 | Ilkhanov |
| 8,942,849 | B2 | 1/2015 | Maisonnier |
| D732,999 | S | 6/2015 | Siegel |
| D733,400 | S | 7/2015 | Cunningham |
| D736,496 | S | 8/2015 | Gonzalez |
| 9,134,547 | B2 | 9/2015 | Mccabe |
| D742,622 | S | 11/2015 | Oygarden |
| 9,180,595 | B2 | 11/2015 | Inada |
| 9,205,556 | B1 | 12/2015 | Magnusson |
| 9,205,560 | B1 | 12/2015 | Edsinger |
| D746,550 | S | 1/2016 | Roberts |
| D749,821 | S | 2/2016 | Mcclora |
| D749,823 | S | 2/2016 | Grosbøl |
| 9,301,556 | B2 | 4/2016 | Koller |
| 9,302,393 | B1 | 4/2016 | Rosen |
| 9,346,165 | B1 | 5/2016 | Metzger |
| 9,376,151 | B2 | 6/2016 | Park |
| D764,146 | S | 8/2016 | Lopez |
| D770,730 | S | 11/2016 | Borovicka |
| 9,494,415 | B2 | 11/2016 | Sweetser |
| D774,148 | S | 12/2016 | Hong |
| D775,789 | S | 1/2017 | Damon |
| 9,569,976 | B2 | 2/2017 | Krauss |
| 9,574,646 | B1 | 2/2017 | Edsinger |
| 9,575,335 | B1 | 2/2017 | Mccabe |
| 9,592,603 | B2 | 3/2017 | Hardouin |
| D784,657 | S | 4/2017 | Adrovic |
| D784,658 | S | 4/2017 | Adrovic |
| 9,669,280 | B2 | 6/2017 | Hua |
| D794,692 | S | 8/2017 | Haranaka |
| D795,320 | S | 8/2017 | Liu |
| D795,321 | S | 8/2017 | Liu |
| D798,029 | S | 9/2017 | Edmiston |
| D800,229 | S | 10/2017 | Baker |
| 9,778,122 | B2 | 10/2017 | Meyer |
| 9,789,607 | B1 | 10/2017 | Whitman |
| 9,789,612 | B2 | 10/2017 | Hoffman |
| 9,796,078 | B2 | 10/2017 | Angle |
| 9,821,466 | B2 | 11/2017 | Bingham |
| 9,842,585 | B2 | 12/2017 | Huang |
| D808,127 | S | 1/2018 | Hedrick |
| 9,868,210 | B1 | 1/2018 | Whitman |
| 9,975,248 | B2 | 5/2018 | Stephens, Jr. |
| 9,992,474 | B2 | 6/2018 | Grunnet-Jepsen |
| 10,007,994 | B2 | 6/2018 | Grunnet-Jepsen |
| 10,018,256 | B1 | 7/2018 | Magnusson |
| D831,308 | S | 10/2018 | Lu |
| D833,116 | S | 11/2018 | Rapp |
| D835,214 | S | 12/2018 | Xiong |
| D838,759 | S | 1/2019 | Kowalski |
| 10,189,158 | B2 | 1/2019 | Edsinger |
| D841,708 | S | 2/2019 | Koshiishi |
| 10,203,209 | B2 | 2/2019 | Roumeliotis |
| D843,690 | S | 3/2019 | Edmiston |
| 10,310,362 | B2 | 6/2019 | Grunnet-Jepsen |
| 10,349,245 | B2 | 7/2019 | Tokuchi |
| D856,593 | S | 8/2019 | Burke |
| 10,369,071 | B2 | 8/2019 | Klassen |
| 10,399,238 | B2 | 9/2019 | Waita |
| D866,684 | S | 11/2019 | Früh |
| D868,866 | S | 12/2019 | Gable |
| D872,152 | S | 1/2020 | Xiong |
| D873,320 | S | 1/2020 | Clerc |
| 10,532,464 | B1 | 1/2020 | Guzman |
| 10,537,998 | B2 | 1/2020 | Salisbury |
| 10,545,497 | B1 | 1/2020 | Cui |
| 10,571,896 | B2 | 2/2020 | Benaim |
| D880,427 | S | 4/2020 | Milroy |
| D885,451 | S | 5/2020 | Chen |
| D888,120 | S | 6/2020 | Hurst |
| D890,102 | S | 7/2020 | Messadek |
| D892,886 | S | 8/2020 | Klassen |
| D892,887 | S | 8/2020 | Klassen |

(56) References Cited

U.S. PATENT DOCUMENTS

| | | | |
|---|---|---|---|
| D893,573 | S | 8/2020 | Yan |
| D896,470 | S | 9/2020 | Eckensweiler |
| 10,780,578 | B2 | 9/2020 | Blankespoor |
| D898,789 | S | 10/2020 | Nazarikhorram |
| D900,251 | S | 10/2020 | Ouyang |
| D901,608 | S | 11/2020 | Okabe |
| 10,890,921 | B2 | 1/2021 | Gillett |
| D911,459 | S | 2/2021 | Xiong |
| 10,921,558 | B2 | 2/2021 | Yao |
| 10,924,638 | B2 | 2/2021 | Swaminathan |
| 10,946,528 | B2 | 3/2021 | Gupta |
| 10,960,539 | B1 | 3/2021 | Kalakrishnan |
| 10,988,192 | B1 | 4/2021 | Thorne |
| D917,833 | S | 5/2021 | Conway |
| D918,979 | S | 5/2021 | Mullan |
| D921,081 | S | 6/2021 | Laplante |
| D927,134 | S | 8/2021 | Robinson |
| D932,531 | S | 10/2021 | Xu |
| 11,179,848 | B2 | 11/2021 | Hume |
| 11,180,205 | B2 | 11/2021 | Amino |
| 11,188,821 | B1 | 11/2021 | Kalakrishnan |
| D938,139 | S | 12/2021 | Alamdar |
| 11,200,816 | B2 | 12/2021 | Wang |
| 11,247,738 | B2 | 2/2022 | Lavalley |
| 11,279,041 | B2 | 3/2022 | Mahoor |
| 11,292,126 | B2 | 4/2022 | Christensen |
| 11,333,954 | B2 | 5/2022 | Bull |
| 11,347,030 | B2 | 5/2022 | Yao |
| D960,517 | S | 8/2022 | Ejiawoko |
| 11,416,003 | B2 | 8/2022 | Whitman |
| 11,435,745 | B2 | 9/2022 | Lee |
| 11,498,223 | B2 | 11/2022 | Williams |
| D972,815 | S | 12/2022 | Wang |
| D975,363 | S | 1/2023 | Paulson |
| 11,546,504 | B2 | 1/2023 | Kim |
| 11,554,484 | B2 | 1/2023 | Jung |
| D981,686 | S | 3/2023 | Hasson |
| 11,600,010 | B2 | 3/2023 | Doutre |
| 11,602,853 | B2 | 3/2023 | Stoianovici |
| 11,623,354 | B2 | 4/2023 | L'Ecuyer |
| 11,632,991 | B2 | 4/2023 | Hull |
| D985,643 | S | 5/2023 | Li |
| 11,645,444 | B2 | 5/2023 | Scheutz |
| 11,686,884 | B2 | 6/2023 | Shinohara |
| D991,347 | S | 7/2023 | Ding |
| 11,699,884 | B2 | 7/2023 | Braun |
| 11,707,852 | B1 | 7/2023 | Hurst |
| 11,736,677 | B2 | 8/2023 | Grunnet-Jepsen |
| D998,285 | S | 9/2023 | Yang |
| 11,807,067 | B2 | 11/2023 | Mancini |
| 11,833,680 | B2 | 12/2023 | Deits |
| 11,850,738 | B2 | 12/2023 | Chernyak |
| 11,851,120 | B2 | 12/2023 | Fay |
| D1,012,031 | S | 1/2024 | Leung |
| D1,013,637 | S | 2/2024 | Leung |
| 11,924,023 | B1 | 3/2024 | Smith |
| D1,024,427 | S | 4/2024 | Li |
| 11,999,423 | B2 | 6/2024 | Whitman |
| 12,036,670 | B2 | 7/2024 | Geating |
| 12,054,208 | B2 | 8/2024 | Swilling |
| 12,070,863 | B2 | 8/2024 | Whitman |
| D1,041,405 | S | 9/2024 | Zhou |
| 12,077,229 | B2 | 9/2024 | Whitman |
| 12,097,626 | B2 | 9/2024 | Ikeda |
| 12,122,044 | B2 | 10/2024 | Webb |
| D1,049,562 | S | 11/2024 | Frawley |
| D1,051,193 | S | 11/2024 | Mahoor |
| 12,134,181 | B2 | 11/2024 | Klingensmith |
| 12,172,537 | B2 | 12/2024 | Gonano |
| 12,205,214 | B2 | 1/2025 | Starke |
| 12,214,497 | B2 | 2/2025 | Whitman |
| 12,235,652 | B2 | 2/2025 | Whitman |
| 12,240,117 | B2 | 3/2025 | Chebotar |
| 12,246,441 | B1 | 3/2025 | Abate |
| 12,251,831 | B2 | 3/2025 | Murphy |
| D1,069,875 | S | 4/2025 | Belon |
| 12,283,704 | B2 | 4/2025 | Kamon |
| 12,318,940 | B2 | 6/2025 | Ishizuka |
| D1,082,878 | S | 7/2025 | Grummas |
| D1,082,881 | S | 7/2025 | Wang |
| D1,085,192 | S | 7/2025 | Abroff |
| 12,365,094 | B2 | 7/2025 | Mccall |
| D1,089,451 | S | 8/2025 | Lin |
| 12,403,611 | B2 | 9/2025 | Mccall |
| 12,420,434 | B1 | 9/2025 | Goldsmith |
| 12,472,648 | B1 | 11/2025 | Hadas |
| D1,107,770 | S | 12/2025 | Wang |
| D1,114,356 | S | 2/2026 | Dau |
| D1,114,898 | S | 2/2026 | Feldman |
| 12,539,618 | B1 | 2/2026 | Mccall |
| 12,558,791 | B1 | 2/2026 | Bernards |
| 12,558,801 | B2 | 2/2026 | Shannon |
| D1,115,887 | S | 3/2026 | Wang |
| D1,117,383 | S | 3/2026 | Wang |
| D1,118,726 | S | 3/2026 | Mccall |
| 2002/0157167 | A1 | 10/2002 | Paul |
| 2003/0070202 | A1 | 4/2003 | Paul |
| 2003/0173926 | A1 | 9/2003 | Hattori |
| 2004/0003950 | A1 | 1/2004 | Ogawa |
| 2004/0044417 | A1 | 3/2004 | Gramnaes |
| 2004/0075168 | A1 | 4/2004 | Azuma |
| 2004/0103740 | A1 | 6/2004 | Townsend |
| 2004/0176875 | A1 | 9/2004 | Iribe |
| 2004/0237168 | A1 | 12/2004 | Braun |
| 2005/0072558 | A1 | 4/2005 | Whitney |
| 2006/0128261 | A1 | 6/2006 | Kawabe |
| 2006/0217838 | A1 | 9/2006 | Sugino |
| 2007/0035143 | A1 | 2/2007 | Blackwell |
| 2008/0239678 | A1 | 10/2008 | Ploeg |
| 2008/0240889 | A1 | 10/2008 | Yokoyama |
| 2009/0059033 | A1 | 3/2009 | Shimada |
| 2009/0321150 | A1 | 12/2009 | Kwon |
| 2010/0057253 | A1 | 3/2010 | Kwon |
| 2010/0061835 | A1 | 3/2010 | Sim |
| 2010/0116566 | A1 | 5/2010 | Ohm |
| 2010/0229663 | A1 | 9/2010 | Wang |
| 2010/0280662 | A1 | 11/2010 | Abdallah |
| 2011/0058800 | A1 | 3/2011 | Lee |
| 2011/0067517 | A1 | 3/2011 | Ihrke |
| 2011/0067520 | A1 | 3/2011 | Ihrke |
| 2011/0068595 | A1 | 3/2011 | Ihrke |
| 2011/0071671 | A1 | 3/2011 | Ihrke |
| 2011/0071673 | A1 | 3/2011 | Ihrke |
| 2011/0071678 | A1 | 3/2011 | Ihrke |
| 2011/0178636 | A1 | 7/2011 | Kwon |
| 2011/0186362 | A1 | 8/2011 | Alfayad |
| 2012/0072215 | A1 | 3/2012 | Yu |
| 2012/0078419 | A1 | 3/2012 | Kim |
| 2012/0155775 | A1 | 6/2012 | Ahn |
| 2012/0215539 | A1 | 8/2012 | Juneja |
| 2012/0310412 | A1 | 12/2012 | Seo |
| 2013/0175816 | A1 | 7/2013 | Kawasaki |
| 2013/0345863 | A1 | 12/2013 | Linder |
| 2014/0039675 | A1 | 2/2014 | Nimer |
| 2014/0132210 | A1 | 5/2014 | Partovi |
| 2014/0217762 | A1 | 8/2014 | Ihrke |
| 2014/0265401 | A1 | 9/2014 | Allen Demers |
| 2014/0279432 | A1 | 9/2014 | Holman |
| 2015/0192399 | A1 | 7/2015 | Raab |
| 2015/0290795 | A1 | 10/2015 | Oleynik |
| 2016/0008988 | A1 | 1/2016 | Kennedy |
| 2016/0052574 | A1 | 2/2016 | Khripin |
| 2016/0064263 | A1 | 3/2016 | Hosek |
| 2016/0167222 | A1 | 6/2016 | Ead |
| 2017/0028551 | A1 | 2/2017 | Hemken |
| 2017/0028563 | A1 | 2/2017 | Hemken |
| 2017/0032035 | A1 | 2/2017 | Gao |
| 2017/0075143 | A1 | 3/2017 | Saylor |
| 2017/0080582 | A1 | 3/2017 | Mugnier |
| 2017/0106738 | A1 | 4/2017 | Gillett |
| 2017/0125008 | A1 | 5/2017 | Maisonnier |
| 2017/0299898 | A1 | 10/2017 | Gallina |
| 2017/0326736 | A1 | 11/2017 | Nagatsuka |
| 2018/0104823 | A1 | 4/2018 | Kaku |

(56) References Cited

U.S. PATENT DOCUMENTS

| | | | | |
|---|---|---|---|---|
| 2018/0136912 | A1 | 5/2018 | Venkataramani | |
| 2018/0182260 | A1 | 6/2018 | Ciniello | |
| 2018/0186015 | A1 | 7/2018 | Xiong | |
| 2018/0232201 | A1 | 8/2018 | Holtmann | |
| 2018/0281179 | A1 | 10/2018 | Michalakis | |
| 2018/0293517 | A1 | 10/2018 | Browne | |
| 2018/0357552 | A1 | 12/2018 | Campos | |
| 2019/0005374 | A1 | 1/2019 | Shankar | |
| 2019/0025611 | A1 | 1/2019 | Saylor | |
| 2019/0079924 | A1 | 3/2019 | Sugiura | |
| 2019/0082811 | A1 | 3/2019 | Gray | |
| 2019/0105783 | A1 | 4/2019 | Al Moubayed | |
| 2019/0232490 | A1 | 8/2019 | Kim | |
| 2019/0278079 | A1 | 9/2019 | Mccabe | |
| 2019/0329413 | A1 | 10/2019 | Johnson | |
| 2019/0337166 | A1 | 11/2019 | Keeney-Ritchie | |
| 2019/0371307 | A1 | 12/2019 | Zhao | |
| 2019/0374161 | A1 | 12/2019 | Ly | |
| 2020/0003256 | A1 | 1/2020 | Koroyasu | |
| 2020/0009739 | A1 | 1/2020 | Moon | |
| 2020/0086479 | A1 | 3/2020 | Messier | |
| 2020/0180145 | A1 | 6/2020 | Xiong | |
| 2020/0180146 | A1 | 6/2020 | Xiong | |
| 2020/0180167 | A1 | 6/2020 | Xiong | |
| 2020/0182336 | A1 | 6/2020 | Xiong | |
| 2020/0182337 | A1 | 6/2020 | Xiong | |
| 2020/0330246 | A1 | 10/2020 | Tognetti | |
| 2020/0352811 | A1 | 11/2020 | Varghese | |
| 2020/0409183 | A1 | 12/2020 | Saylor | |
| 2021/0146214 | A1 | 5/2021 | Lim | |
| 2021/0162602 | A1 | 6/2021 | Kawaguchi | |
| 2021/0221004 | A1 | 7/2021 | Gupta | |
| 2021/0360989 | A1 | 11/2021 | Nagatsuka | |
| 2021/0387346 | A1 | 12/2021 | Gillett | |
| 2022/0186787 | A1* | 6/2022 | Thompson | F16H 49/001 |
| 2022/0227010 | A1 | 7/2022 | Takabu | |
| 2022/0250231 | A1 | 8/2022 | Berger | |
| 2022/0287853 | A1 | 9/2022 | Ren | |
| 2022/0307581 | A1 | 9/2022 | Johansen | |
| 2022/0388174 | A1 | 12/2022 | Stathis | |
| 2022/0390952 | A1 | 12/2022 | Yu | |
| 2022/0395974 | A1 | 12/2022 | Balasubramanian | |
| 2022/0410380 | A1 | 12/2022 | Lu | |
| 2023/0033779 | A1 | 2/2023 | Gazeau | |
| 2023/0048725 | A1 | 2/2023 | Barbour | |
| 2023/0112596 | A1 | 4/2023 | Yang | |
| 2023/0143315 | A1 | 5/2023 | Whitman | |
| 2023/0154055 | A1 | 5/2023 | Besenbruch | |
| 2023/0173683 | A1 | 6/2023 | Gomez | |
| 2023/0182296 | A1 | 6/2023 | Sermanet | |
| 2023/0287941 | A1 | 9/2023 | Dellon | |
| 2023/0347514 | A1 | 11/2023 | Xiao | |
| 2023/0390948 | A1 | 12/2023 | Hsu | |
| 2024/0003380 | A1 | 1/2024 | Vyas | |
| 2024/0044331 | A1 | 2/2024 | Sterling | |
| 2024/0091964 | A1 | 3/2024 | Smith | |
| 2024/0181632 | A1* | 6/2024 | Steffen | B25J 9/102 |
| 2024/0181637 | A1 | 6/2024 | Gillett | |
| 2024/0217096 | A1* | 7/2024 | Maleki | B25J 13/088 |
| 2024/0217104 | A1 | 7/2024 | Neville | |
| 2024/0228191 | A1 | 7/2024 | Kumar | |
| 2024/0289606 | A1 | 8/2024 | Wang | |
| 2024/0294219 | A1 | 9/2024 | Gildert | |
| 2024/0299195 | A1 | 9/2024 | Perry | |
| 2024/0300109 | A1 | 9/2024 | Shaw | |
| 2024/0430464 | A1 | 12/2024 | Kalva | |
| 2025/0042020 | A1 | 2/2025 | Fleury | |
| 2025/0042024 | A1 | 2/2025 | Dijkman | |
| 2025/0050507 | A1 | 2/2025 | Camasmie | |
| 2025/0122927 | A1 | 4/2025 | Sweeney | |
| 2025/0131347 | A1 | 4/2025 | Wells | |
| 2025/0147517 | A1 | 5/2025 | Swilling | |
| 2025/0187202 | A1 | 6/2025 | Mccall | |
| 2025/0196326 | A1 | 6/2025 | Katz | |
| 2025/0196327 | A1 | 6/2025 | Geating | |
| 2025/0205908 | A1 | 6/2025 | Goldsmith | |
| 2025/0242500 | A1 | 7/2025 | Mccall | |
| 2025/0322372 | A1 | 10/2025 | Berlin | |
| 2025/0375905 | A1 | 12/2025 | Goldsmith | |
| 2026/0014698 | A1 | 1/2026 | Fleury | |
| 2026/0027736 | A1 | 1/2026 | Yeganeh | |

FOREIGN PATENT DOCUMENTS

| | | | |
|---|---|---|---|
| CN | 102357889 | | 2/2012 |
| CN | 302064216 | S | 9/2012 |
| CN | 302255798 | | 12/2012 |
| CN | 302255798 | S | 12/2012 |
| CN | 303298408 | | 7/2015 |
| CN | 304998646 | S | 1/2019 |
| CN | 305154358 | S | 5/2019 |
| CN | 209615545 | | 11/2019 |
| CN | 111267126 | A | 6/2020 |
| CN | 210998685 | | 7/2020 |
| CN | 306231734 | | 12/2020 |
| CN | 212287717 | | 1/2021 |
| CN | 112959343 | | 6/2021 |
| CN | 306894068 | S | 10/2021 |
| CN | 114147745 | A | 3/2022 |
| CN | 307563528 | | 9/2022 |
| CN | 307563528 | S | 9/2022 |
| CN | 115338887 | A | 11/2022 |
| CN | 115503013 | | 12/2022 |
| CN | 115649316 | | 1/2023 |
| CN | 218802294 | | 4/2023 |
| CN | 308117231 | S | 7/2023 |
| CN | 116714698 | | 9/2023 |
| CN | 117047810 | | 11/2023 |
| CN | 117301022 | | 12/2023 |
| CN | 117462367 | | 1/2024 |
| CN | 308675468 | S | 6/2024 |
| CN | 308733683 | S | 7/2024 |
| CN | 308157136 | S | 8/2024 |
| CN | 309115067 | S | 2/2025 |
| CN | 309180560 | S | 3/2025 |
| CN | 309225998 | S | 4/2025 |
| CN | 309319491 | S | 6/2025 |
| CN | 309417137 | S | 8/2025 |
| CN | 309456813 | S | 8/2025 |
| DE | 3345607 | A1 | 6/1985 |
| DE | 10217020 | | 11/2003 |
| DE | 10217020 | B4 | 2/2004 |
| DE | 202016001164 | U1 | 3/2016 |
| DE | 112018003604 | T5 | 5/2020 |
| DE | 402020100743 | | 2/2021 |
| DE | 102022107533 | | 10/2023 |
| DE | 102022107553 | A1 | 10/2023 |
| DE | 112018003604 | | 11/2023 |
| EM | 0151166350001 | | 1/2026 |
| EP | 2186552 | A1 | 5/2010 |
| EP | 3542139 | B1 | 3/2021 |
| ES | 59639 | U | 6/1957 |
| FR | 2595950 | A1 | 9/1987 |
| GB | 2446885 | A | 8/2008 |
| GB | 2472046 | | 4/2013 |
| GB | 2496335 | | 5/2013 |
| GB | 90038381840001 | | 11/2017 |
| GB | 90058203540003 | | 3/2019 |
| GB | 90068598980011 | | 3/2020 |
| GB | 6367851 | | 6/2024 |
| GB | 6420068 | | 2/2025 |
| GB | 6420070 | | 2/2025 |
| JP | 1106466 | | 4/2001 |
| JP | 1162349 | | 1/2003 |
| JP | 2003266362 | A | 9/2003 |
| JP | 1301180 | | 5/2007 |
| JP | 1349407 | | 1/2009 |
| JP | 1412554 | | 5/2011 |
| JP | 1602569 | | 4/2018 |
| JP | D1638014 | | 7/2019 |
| JP | 6775862 | B1 | 10/2020 |
| JP | 1698172 | | 10/2021 |
| KR | 20180107353 | | 10/2018 |
| KR | 300994127 | | 2/2021 |

(56) References Cited

FOREIGN PATENT DOCUMENTS

| | | |
|---|---|---|
| SU | 1734994 | 5/1992 |
| TW | 105306360 | 2/2018 |
| WO | 243074 | 5/2002 |
| WO | 2009030922 | 3/2009 |
| WO | 2017103682 A2 | 6/2017 |
| WO | 2019163258 A1 | 8/2019 |
| WO | 2019234706 | 12/2019 |
| WO | 2020190594 A1 | 9/2020 |
| WO | 2022207106 | 10/2022 |
| WO | 2023110778 | 6/2023 |
| WO | D224613 | 10/2023 |
| WO | 2023246994 | 12/2023 |
| WO | 2023246995 | 12/2023 |
| WO | 2024072966 | 4/2024 |
| WO | 2024085904 | 4/2024 |
| WO | 2024111509 A1 | 5/2024 |
| WO | 2024112350 | 5/2024 |
| WO | 2024112351 | 5/2024 |
| WO | 2024123766 | 6/2024 |
| WO | 2024163992 | 8/2024 |
| WO | 2025019583 | 1/2025 |
| WO | WODM243074 | 1/2025 |
| WO | 2025042802 | 2/2025 |
| WO | 2025072321 | 4/2025 |
| WO | 2025103557 A1 | 5/2025 |

OTHER PUBLICATIONS

Scarcia et al., Towards simplicity: On the design of a 2-DOFs wrist mechanism for tendon-driven robotic hands, 2015. OEEE, p. 1317-1322 (Year: 2015).

Bridgwater et al., The Robonaut 2 hand—designed to do work with tools, 2012, IEEE, p. 3425-3430 (Year: 2012).

Hand et al., FAS A flexible antagonistic spring element for a high performance over, 2011, IEEE, p. 1366-1372 (Year: 2011).

Dalley et al., Design of a Multifunctional Anthropomorphic Prosthetic Hand With Extrinsic Actuation, 2009, IEEE, p. 1-8 (Year: 2009).

Kamogawa et al., Development of tendon-driven robotic hand for biped humanoid robot, 2014. IEEE, p. 914-917 (Year: 2014).

Toedtheide et al., An Integrated, Force-Sensitive, Impedance Controlled, Tendon-Driven Wrist: Design, Modeling, and Control, 2020, IEEE, p. 25-32 (Year: 2020).

Mizuuchi et al., Design and development of a compressor-embedded pneumatic-driven musculoskeletal humanoid Publisher: IEEE, 2012, pg., (Year: 2012).

Netzev et al., "Many Faced Robot—Design and Manufacturing of a parametric, Modular and Open Source Robot Head," IEEE, p. 342-348 (2019).

Cilmi et al., "Design and Implementation of Real Time Face Tracking Humanoid Robot," 2018 , IEEE, p. 1-6 (Year: 2018).

https://gagadget.com/en/announce/156738- xiaomi-presenteda-robot-humanoid-cyberone-it-can-communicate-recognize-emotions-and-give-fowers/(Nov. 8, 2022) (Year: 2022).

"Powered Ankle-Foot Prosthesis for the improvement of Amputee Ambulation." Published 23-26. (Year: 2007).

"An Underactuated Active Transfemoral Prosthesis with Series Elastic Actuators Enables Multiple Locomotion Tasks."—Jun. 17, 2024.

https://humanoid.guide/what-is-a-humanoid/ (Year: 2026).

https://humanoidroboticstechnology.com/articles/top-12-humanoid-robots-of-2026. (Year: 2026).

https://startup-weekly.com/Figure-announces-70m-Seres-A-to-support-commercialization-of-Figure-01-humanoid-obot5/312/2023 ( Year: 2023).

https://itcanthink.substack.com/p/how-human-should-your-humanoid-be Sep. 17, 2026) (Year: 2026).

https://parametric-architecture.com/figure-03-a-humanoid-robots/?srsltid=AfmBOorxq38eNuC0H_IOI3YygfB_WB3WxOC9fHbAij_j4vWoy3rW_KI_(Oct. 15, 2025) (Year: 2025).

https://www.techeblog.com/xpeng-iron-humanoid-robot-specs-launch-reveal/(Nov. 5, 2025) (Year: 2025).

http://www.yankodesign.com/2025/03/25/neo-gamma-humanoid-robot-dons-a-3d-printed-fabric-skin-to-better-blend-with-your-home/ (Mar. 25, 2025) (Year: 2025).

http/ww.forbes.com/sites/jonoetsier/2026/01/02/scientists-give-obots-skin-with-pain-sensations-and-human-like-reftees/ (Jan. 3, 2026) (Year: 2026).

CN-111267126-A Machine Translation (Year: 2020).

Merged original document with English translation (CN 115070744); paragraphs added for citation purposes. (Year: 2026).

Merged original document with English translation (KR 20180107353). (Year: 2026).

Liu et al., "Visual Instruction Tuning," 37th Conference on Neural Information Processing Systems (NeurIPS 2023).

Lynch, Corey, and Pierre Sermanet. "Language conditioned imitation learning over unstructured data." arXiv preprint arXiv:2005.07648 (Jul. 7, 2020).

Lynch, Corey, et al. "Interactive language: Talking to robots in real time." IEEE Robotics and Automation Letters (Oct. 12, 2023).

Lynch, Corey, et al. "Learning latent plans from play." Conference on robot learning. Pmlr, (Dec. 20, 2020).

Lynch, Corey, Kamelia Aryafar, and Josh Attenberg. "Images don't lie: Transferring deep visual semantic features to large-scale multimodal learning to rank." Proceedings of the 22nd ACM SIGKDD international conference on knowledge discovery and data mining. (Nov. 20, 2015).

Mandi et al., "Towards More Generalizable One-shot Visual Imitation Learning," bencharXiv: 2110.13423v2 [cs.RO] Feb. 8, 2022.

Maniparambil et al., "Do Vision and Language Encoders Represent the World Similarly?" IEEE Xplore (2024).

Peng et al., "DeepMimic: Example-Guided Deep Reinforcement Learning of Physics-Based Character Skills," ACM Trans. Graph., vol. 37, No. 4, Article 143. Publication date: Aug. 2018.

Pirk, Sören, et al. "Online object representations with contrastive learning." arXiv preprint arXiv:1906.04312 (Jun. 10, 2019).

Radford et al., "Improving Language Understanding by Generative Pre-Training," 2018.

Radford et al., "Language Models are Unsupervised Multitask Learners," 2019.

Radford et al., "Learning Transferable Visual Models From Natural Language Supervision," Proceedings of the 38 th International Conference on Machine Learning, PMLR 139, 2021.

Raffel et al., "Exploring the Limits of Transfer Learning with a Unified Text-to-Text Transformer," Journal of Machine Learning Research 21 (2020) 1-67.

Ramachandruni et al., "Attentive Task-Net: Self Supervised Task-Attention Network for Imitation Learning using Video Demonstration," 2020 IEEE International Conference on Robotics and Automation (ICRA) May 31—Paris, France. (Aug. 31, 2020).

Rombach et al., "High-Resolution Image Synthesis with Latent Diffusion Models," IEEE Xplore (2022).

Sanh et al., "DistilBERT, a distilled version of BERT: smaller, faster, cheaper and lighter," arXiv:1910.01108v4 (Mar. 1, 2020).

Schulman et al., "Proximal Policy Optimization Algorithms," arXiv:1707.06347v2 (Aug. 28, 2017).

Sermanet, Pierre, et al. "Time-contrastive networks: Self-supervised learning from video." 2018 IEEE international conference on robotics and automation (ICRA). IEEE, (Mar. 20, 2018).

Sharma et al., "Third-Person Visual Imitation Learning via Decoupled Hierarchical Controller," 33rd Conference on Neural Information Processing Systems (NeurIPS 2019), Vancouver, Canada.

Sieb et al., "Graph-Structured Visual Imitation," 3rd Conference on Robot Learning (CoRL 2019), Osaka, Japan. (May 12, 2020).

Smith et al., "AVID: Learning Multi-Stage Tasks via Pixel-Level Translation of Human Videos," arXiv:1912.04443v3 (Jun. 21, 2020).

Stadie et al., "Third-Person Imitation Learning," arXiv:1703.01703v2 (Sep. 22, 2019).

Sun et al., "Learning by Watching via Keypoint Extraction and Imitation Learning," Machines 2022, 10, 1049. https://doi.org/10.3390/machines10111049 (Nov. 9, 2022).

Touvron et al., "Llama 2: Open Foundation and Fine-Tuned Chat Models," arXiv:2307.09288v2 (Jul. 19, 2023).

(56) References Cited

OTHER PUBLICATIONS

Vaswani et al., "Attention Is All You Need," 31st Conference on Neural Information Processing Systems (NIPS 2017), Long Beach, CA, USA. (Jun. 12, 2017).
Wang et al., "StructBERT: Incorporating Language Structures Into Pre-Training for Deep Language Understanding,," arXiv:1908.04577v3 (Sep. 27, 2019).
Wiedebach, Georg, et al. "Walking on partial footholds including line contacts with the humanoid robot atlas." 2016 IEEE-RAS 16th International Conference on Humanoid Robots (Humanoids). IEEE, 2016.
Xiong et al., "Learning by Watching: Physical Imitation of Manipulation Skills from Human Videos," arXiv:2101.07241v2 (Nov. 14, 2021).
Yao et al., "Filip: Fine-Grained Interactive Language-Image Pre-Training," arXiv:2111.07783v1 (Nov. 9, 2021).
Zhang et al., "An Object Attribute Guided Framework for Robot Learning Manipulations from Human Demonstration Videos," 2019 IEEE/RSJ International Conference on Intelligent Robots and Systems (IROS) Macau, China, (Nov. 4, 2019).
Zhou et al., "Watch, Try, Learn: Meta-Learning From Demonstrations and Rewards," arXiv:1906.03352v4 (Jan. 30, 2020).
Zitkovich, Brianna, et al. "Rt-2: Vision-language-action models transfer web knowledge to robotic control." Conference on Robot Learning. PMLR, (Jul. 28, 2023).
https://supercarblondie.com/unitree-humanoid-robot-word-speed-record/(Year 2024).
https://robotsguide.com/robots/hrp4 (Year: 2010).
https://www.economist.com/science-and-technology/2024/06/05/he-uesto-buld-obots-that-look-and-behavelike-humans(Year 2024).
https://lifearchitect.ai/humanoids/ (Year: 2023).
https://robotsguide.com/robots/optimus (Year: 2022).
Tsagarakis et al., The design of the lower body of the compliant humanoid robot "cCub", 2011, IEEE, p. 2035-2040 (Year: 2011).
Tsagarakis et al., Lower Body Design of the 'iCub' a Human-baby like Crawling Robot, 2006, IEEE., p. 450-455 (Year: 2006).
Park et al., Whole-body walking pattern using pelvis-rotation for long stride and arm swing for yaw angular momentum compensation, 2021, IEEE, p. 47-52 (Year: 2021).
Kawamura et al., One-leg Jumping with Virtual Spring Principle, 2008, IEEE, p. 34-39 (Year: 2008).
Lohmeier et al., Modular joint design for performance enhanced humanoid robot LOLA, 2006, IEEE, p. 88-93 (Year: 2006).
Haywood et al., A novel 3D printed leg design for a biped robot, 2017, IEEE, p. 1-6 (Year: 2006).
Asano et al., Achievement of twist squat by musculoskeletal humanoid with screw-home mechanism, 2013, IEEE, p. 4649-4654 ( Year: 2013).
Mike, (date published Dec. 18, 2023), Tesla Optimus Gen 2 Humanoid Robot, Mikeshouts.com, URL: (https://mikeshouts.com/tesla-optimus-gen-2-humanoid-robot/, (Year: 2023).
English translation of DE-102022107553-A1 (Year: 2023).
English translation of DE-10217020-B4 (Year: 2004).
https:/www.humanoidsdaily.com/news/figure-reveals-figure-03-in-new-teeser-full-unveiling-set-for-october-10 (Oct. 7, 2025) (Year: 2025).
https://www.analyticsinsight.net/artificial-inteligence/xiaomis-cyberone-a-new-humanoid-obot-to-fight-teslabot (Sep. 8, 2022) (Year: 2022).
htp/ww.usatoday.com/story/tech/gaming/2021/08/20/tesla-bot-elon-musk-humanoid-robots/8208107002/(Year: 2021).
Available online at https://www.youtube.com/watch?v=q8ldbodRG14, at least as early as May 22, 2019.
Available online at https://youtu.be/GtPs_ygfaEA?si=7lv6MEFvFoaacKfa, at least as early as Aug. 15, 2023.
Available online at https://youtu.be/_MBd_XfXy9M?si=PbEHUJpRUFqaxS3J, at least as early as Jun. 26, 2023.
Available online at https://youtu.be/SHPxcRBIXN0?si=VbJqbK7jzUqtZGmn, at least as early as Sep. 26, 2023.
Available online at https://youtu.be/BvFxD-8AhJA?si=Vx1F4a76tbQDUX48, at least as early as Nov. 16, 2023.
Available online at https://youtu.be/XiQkeWOFwmk?si=1qOPC8gXgmmGvXRT, at least as early as May 16, 2023.
Available online at https://youtu.be/cpraXaw7dyc?si=JvPaT6eMA18psrmU, at least as early as Dec. 13, 2023.
Available online at https://youtu.be/BNSZ8Fwcd20?si=_YnVgjYblVuhASk1, at least as early as Oct. 27, 2023.
Available online at https://youtu.be/SS3Ga2HQQ0s?si=Dwr3sJuCsOeUoSLj, at least as early as Nov. 20, 2023.
Available online at https://youtu.be/sihlDeJ4Hmk?si=fJsKpvRFPzFejmS6, at least as early as Dec. 27, 2023.
Available online at https://www.youtube.com/watch?v=zkBnFPBV3f0, at least as early as Jul. 11, 2013.
Available online at https://www.youtube.com/watch?v=oXBYZxa25vc&t=1s, at least as early as Apr. 3, 2013.
Available online at https://www.youtube.com/watch?v=LBeml9AmTT4, at least as early as Apr. 7, 2015.
Available online at https://www.youtube.com/watch?v=IE-YBaYjbqY, at least as early as Dec. 10, 2013.
Available online at https://www.youtube.com/watch?v=y-j4dixQQml&t=222s, at least as early as May 22, 2012.
Available online at https://www.youtube.com/watch?v=Bmglbk_Op64&t=1s, at least as early as Nov. 10, 2011.
Available online at https://www.youtube.com/watch?v=20GHG-R9eFl, at least as early as Mar. 6, 2023.
Available online at https://www.youtube.com/watch?v=67CUudkjEG4, at least as early as Oct. 26, 2009.
Available online at https://www.youtube.com/watch?v=yBmatGQ0giY&t=1s, at least as early as Aug. 11, 2022.
Available online at https://www.youtube.com/watch?v=_mQJw8VhZ7w&t=111s, as least as early as Oct. 5, 2022.
Available online at https://www.youtube.com/watch?v=1fC7b2LjVW4, at least as early as Jul. 12, 2016.
Available online at https://www.youtube.com/watch?v=UPOLcE1vwA0, at least as early as Apr. 28, 2016.
Available online at https://www.youtube.com/watch?v=ioOkbUQqmZ0, at least as early as Nov. 9, 2022.
Available online at https://www.youtube.com/watch?v=CUhuhleQNos, at least as early as May 22, 2019.
Available online at https://www.youtube.com/watch?v=dY57qnD_O7U, at least as early as Jul. 27, 2021.
Jeung et al., Realization of human neck motion with novel robotic mechanism, 2016, IEEE, p. 482-486 (Year: 2016).
Barker et al., Natural head movement for HRI with a muscular-skeletal head and neck robot, 2017, IEEE, p. 587-592 (Year: 2017).
Gao et al., Development of a low motion-noise humanoid neck: Statics analysis and experimental validation, 2010, IEEE, p. 1203-1208 (Year: 2010).
Keselman et al., "Intel RealSense stereoscopic depth cameras," in Proceedings of the IEEE Conference on Computer Vision and Pattern Recognition Workshops, pp. 1-10, 2017.
Nakada et al., Deep Learning of Neuromuscular and Visuomotor Control of a Biomimetic Simulated Humanoid, 2020, IEEE, p. 3952-3959 (Year: 2020).
Lim et al., Basic emotional walking using a biped humanoid robot, 1999, IEEE, p. 954-959 (Year: 1999).
Albers et al., Upper Body of a new Humanoid Robot—the Design of ARMAR III, 2006, IEEE, p. 308-309 (Year: 2006).
Park et al., Mechanical Design of Humanoid Robot Platform KHR-3 (KAIST Humanoid Robot 3: HUBO), 2005, IEEE, p. 321-3226 (2005).
Englsberger et al., "Overview of the Torque-Controlled Humanoid Robot TORO," 2014 14th IEEE-RAS International Conference on Humanoid Robots (Humanoids), Nov. 18-20, 2014. Madrid, Spain.
Cheng et al., "Human Posture Estimation Using Voxel Data for "Smart" Airbag Systems: Issues and Framework," IEEE, p. 84-89 (2004).
Droeschel et al., "Learning to Interpret Pointing Gestures with a Time-of-Flight Camera," IEEE, p. 481-488 (2011).
Frohlich et al., "Design and Impementation of a Spherical Joint for Mobile Manipulators," IEEE, p. 251-258 (2016).

(56) References Cited

OTHER PUBLICATIONS

Netzev et al., Design and implementation of a spherical joint for mobile manipulators, 2019, IEEE, p. 342-348 (Year: 2019).
Haddadin et al., The "DLR crash report": Towards a standard crash-testing protocol for robot safety—Part II: Discussions, 2009, IEEE, p. 280-287 (Year: 2009).
Yaghoubi et al., Region-Based CNNs for Pedestrian Gender Recognition in Visual Surveillance Environments, 2019, IEEE, p. 1-5 (Year: 2019).
Pateromichelakis et al., Head-eyes system and gaze analysis of the humanoid robot Romeo, 2014, IEEE, p. 1374-131379 (Year: 2014).
Mokhtari et al., Taban:A Retro-Projected Social Robotic—Head for Human-Robot Interaction, 2019, IEEE, p. 46-51 (Year: 2019).
Merged original document with English translation (CN 112959343); Paragraphs added for citation purposes. (Year: 2021).
Merged original document (KR 20180107353) with English Translation (Year: 2018).
Duran-Hernandez et al., "Control Implementation in a Low-cost Designed Biped Robot to Reproduce Squats," The 10th International Conference on Control, Mechatronics and Automation, Nov. 9, 2022.
Hao et al., Design and kinematics analysis of a 4-DOF articulated steering mechanism, 2015, IEEE, p. 5875-5880 (Year: 2015).
Or, Computer Simulations of a Humanoid Robot Capable of Walking Like Fashion Models, 2012, IEEE, p. 241-248 (Year: 2012).
Available online at https://www.youtube.com/watch?v=Fb_R6IDDU4A, at least as early as Oct. 9, 2020.
Available online at https://www.youtube.com/watch?v=_mQJw8VhZ7w, at least as early as Oct. 5, 2022.
Available online at https://www.youtube.com/watch?v=a-R4H8-8074, at least as early as Jun. 6, 2015.
Ophaswongse et al., Optimal Design of a Novel 3-DOF Orientational Parallel Mechanism for Pelvic Assistance on a Wheelchair: An Approach Based on Kinematic Geometry and Screw Theory, 2020, IEEE, p. 3315-3322 (Year: 2020).
Shafti et al., Real-time Robot-assisted Ergonomics, 2019, IEEE, p. 1975-1981 (Year: 2019).
Luo et al., Human body trajectory generation using point cloud data for robotics massage applications, 2014, IEEE, p. 5612-5617 (Year: 2014).
Cheng et al., Human posture estimation using voxel data for "smart" airbag systems: issues and framework, 2004, IEEE, p. 84-89 (Year: 2004).
Or, Humanoids Grow a Spine: The Effect of Lateral Spinal Motion on the Mechanical Energy Efficiency, 2012, IEEE, p. 1-11 (Year : 2012).
Souissi et al., Influence of the number of humanoid vertebral column pitch joints in flexion movements, 2011, IEEE, p. 227-282 ( Year: 2011).
Han et al., Mechanical design of robot lower body based on four-bar linkage structure for energy efficient bipedal walking, 2016, IEEE, p. 402-407 (Year: 2016).
Park et al., Design of a lower limb exoskeleton including roll actuation to assist walking and standing up, 2015, IEEE, p. 359-354 ( Year: 2015).
Tsagarakis et al., Lower body realization of the baby humanoid 'iCub', 2007, IEEE, p. 3616-3622 (Year: 2007).
Machine translation of CN-114147745-A (Year: 2022).
Machine translation of DE-112018003604-T5 (Year: 2020).
Machine translation of WO-2020190594-A1. (Year: 2020).
"A lightweight robotic leg prosthesis replicating the biomechanics of the knee, ankle, and toe joint", published Nov. 23, 2022 retrieved from Wayback machine URLhttps://www.science.org/doi/10.1126/scirobotics.abo3996 on Feb. 22, 2026 (Year: 2022).
https://web.archive.org/web/20220702203427/https://singularityhub.com/2010/01/20/ iwalk-presents-worlds-first-actively-powered-foot-and-ankle/ (Year: 2010).
https://www.hola.com/us/celebrities/20221003337667/elon-musk-unveils-robot/ Oct. 3, 2022 (Year: 2022).
https://robotsguide.com/robots/figure (Year: 2023).
https://www.cnn.com/2022/09/30/business/tesla-bot-robot Oct. 1, 2022 (Year: 2022).
https://electrek.co/2023/05/16/tesla-bot-sideshow-new-footage-robots/5/16/2023 (Year: 2023).
https://www.humanoidsdaily.com/news/figure-reveals-fgure-03-in-new-teaser-full-unveling-set-for-october-10 (Oct. 7, 2025) (Year: 2025).
htp://www.analyticsinsight.net/artificial-inteligence/xiaomis-cyberone-a-new-humanoid-obot-to-fight-teslabot(Sep. 8, 2022) (Year: 2022).
Brohan, Anthony, et al. "Rt-1: Robotics transformer for real-world control at scale." arXiv preprint arXiv:2212.06817 (Dec. 13, 2022).
Brown et al., "Language Models are Few-Shot Learners," arXiv:2005.14165v4 (Jul. 22, 2020).
Calvert, Duncan, et al. "A fast, autonomous, bipedal walking behavior over rapid regions." 2022 IEEE-RAS 21st International Conference on Humanoid Robots (Humanoids). IEEE, 2022.
Chen et al., "InternVL: Scaling up Vision Foundation Models and Aligning for Generic Visual-Linguistic Tasks," https://github.com/OpenGVLab/InternVL (2024).
Dafarra, Stefano, et al. "Non-linear trajectory optimization for large step-ups: Application to the humanoid robot atlas." 2020 IEEE/RSJ International Conference on Intelligent Robots and Systems (IROS). IEEE, 2020.
Ding, Tianli, et al. "Goalseye: Learning high speed precision table tennis on a physical robot." arXiv preprint arXiv:2210.03662 (Oct. 13, 2022).
Driess, Danny, et al. "Palm-e: An embodied multimodal language model." (Mar. 6, 2023).
Dwibedi, Debidatta, et al. "Learning actionable representations from visual observations." 2018 IEEE/RSJ international conference on intelligent robots and systems (IROS). IEEE, Feb. 2, 2018).
Garcia, Gabriel, Robert Griffin, and Jerry Pratt. "0-step capturability, motion decomposition and global feedback control of the 3D variable height-inverted pendulum." arXiv preprint arXiv:1912.06078 (2019).
Gia et al., "Densely Connected Feature Pyramid Network for Image Segmentation," 2020 8th International Conference on Digital Home (ICDH).
Griffin, Robert J., et al. "Capture point trajectories for reduced knee bend using step time optimization." 2017 IEEE-RAS 17th International Conference on Humanoid Robotics (Humanoids). IEEE, 2017.
Griffin, Robert J., et al. "Footstep planning for autonomous walking over rough terrain." 2019 IEEE-RAS 19th international conference on humanoid robots (humanoids). IEEE, 2019.
Griffin, Robert J., et al. "Straight-leg walking through underconstrained whole-body control." 2018 IEEE International Conference on Robotics and Automation (ICRA). IEEE, 2018.
Griffin, Robert J., et al. "Walking stabilization using step timing and location adjustment on the humanoid robot, atlas." 2017 IEEE/RSJ International Conference on Intelligent Robots and Systems (IROS). IEEE, 2017.
Gupta, Abhishek, et al. "Bootstrapped autonomous practicing via multi-task reinforcement learning." arXiv preprint arXiv:2203.15755 (Mar. 29, 2022).
Gupta, Abhishek, et al. "Relay policy learning: Solving long-horizon tasks via imitation and reinforcement learning." arXiv preprint arXiv:1910.11956 (Oct. 25, 2019).
Heravi, Negin, et al. "Visuomotor control in multi-object scenes using object-aware representations." arXiv preprint arXiv:2205.06333 (May 12, 2022).
Jang, Eric, et al. "Bc-z: Zero-shot task generalization with robotic imitation learning." Conference on Robot Learning. PMLR, (Feb. 4, 2022).
Kim et al., "Giving Robots a Hand: Learning Generalizable Manipulation with Eye-in-Hand Human Video Demonstrations," arXiv:2307.05959v1 (Jul. 12, 2023).
Kim et al., "Parallel Feature Pyramid Network for Object Detection," ECCV 2018.
Kirillov et al., "Panoptic Feature Pyramid Networks," IEEE Xplore (2019).

(56) References Cited

OTHER PUBLICATIONS

Lee et al., "Learning Robot Activities from First-Person Human Videos Using Convolutional Future Regression," IEEE Xplore (2017).
Li et al., "Supervision Exists Everywhere: A Data Efficient Contrastive Language-Image Pre-Training Paradigm," arXiv:2110.05208v2 (Mar. 14, 2022).
Li et al., BLIP: Bootstrapping Language-Image Pre-training for Unified Vision-Language Understanding and Generation, Proceedings of the 39 th International Conference on Machine Learning, Baltimore, Maryland, USA, PMLR 162, 2022.
Lin et al., "Feature Pyramid Networks for Object Detection," IEEE Xplore (2017).
Lin et al., "Feature Pyramid Networks for Object Detection," IEEE Xplore (2024).
Liu et al., "A Survey of Attacks on Large Vision-Language Models: Resources, Advances, and Future Trends," Journal of Latex Class Files, vol. 14, No. (Aug. 8, 2021).
Liu et al., "Imitation from Observation: Learning to Imitate Behaviors from Raw Video via Context Translation," arXiv:1707.03374v2 (Jun. 18, 2018).
Liu et al., "RoBERTa: A Robustly Optimized BERT Pretraining Approach," arXiv:1907.11692v1 (Jul. 26, 2019).

* cited by examiner

CLUTCH FOR AN ACTUATOR FOR A HUMANOID ROBOT

PRIORITY CLAIM AND CROSS-REFERENCE TO RELATED APPLICATIONS

This application is claims priority under 35 U.S.C. § 119(e) to U.S. Provisional Patent Application No. 63/626,085, which is expressly incorporated by reference herein in its entirety.

Reference is hereby made to: (i) U.S. patent application Ser. Nos. 19/000,626, 19/006,191, 18/919,274, 18/919,263, (ii) PCT Application Nos. US/2025/10425, US/2025/11450, and (iii) U.S. Provisional Patent Application Nos. 63/557,874, 63/626,040, 63/626,105, 63/625,362, 63/625,370, 63/625,381, 63/625,384, 63/625,389, 63/625,405, 63/625,423, 63/625,431, 63/685,856, 63/696,507, 63/696,533, 63/706,768, 63/626,035, 63/564,741, 63/626,034, 63/626,037, 63/626,030, 63/566,595, 63/626,028, 63/573,528, 63/561,316, 63/634,697, 63/573,226, 63/707,949, 63/707,897, 63/707,547, 63/707,003 each of which is expressly incorporated by reference herein in its entirety.

TECHNICAL FIELD

This disclosure relates to a clutch for a robot, specifically a clutch for an actuator configured to be positioned within a humanoid robot.

BACKGROUND

The current labor market within the United States is confronting an unprecedented labor shortage, characterized by over 10 million unfilled positions. A significant proportion of these vacancies pertain to occupations that are deemed unsafe, undesirable, or involve hazardous working conditions. This persistent and escalating shortage of available labor has created an urgent imperative for the development and deployment of advanced robotic systems capable of performing tasks that are unattractive or pose risks to human workers. To effectively address this widening gap in the workforce, it has become critical to design and engineer robots that can operate with high efficiency and reliability within human-centric environments. These environments often demand capabilities such as physical dexterity, sustained endurance, precise manipulation, and the ability to navigate complex spaces designed for humans.

Advanced general-purpose humanoid robots have emerged as a promising solution to meet these challenges. These robots are meticulously engineered to replicate the human form and emulate human functionality, typically featuring bipedal locomotion with two legs, bilateral manipulation abilities with two arms, and a display to facilitate interaction with human users. The anthropomorphic design enables these robots to seamlessly integrate into environments originally designed for humans, thereby minimizing the need for extensive modifications to existing infrastructures. As these robots endeavor to mimic the human body, it becomes essential to equip them with actuators to enable them to move and perform human-like tasks. However, there is a need to protect these actuators and the components they are coupled to in the event that the rotational torque transmitted from the motor exceeds a design strength of an attached gearbox or other attached components structural failures can occur.

SUMMARY

According to an aspect of the present disclosure, a torque protection apparatus 700 is provided. The apparatus 700 includes a gearbox 650 coupled to a motor 612. An output ring 656 is coupled to the output of the gearbox 650, the output ring 656 having a first planar disc surface 657*a* and a second planar disc surface 657*b*. An outer body 702 surrounds the gearbox 650, output ring 656, and axle 611 and is coupled to an output adaptor 604. An inner body 704 is within an interior volume 703*a* of the outer body 702. A first clutch friction plate 708*a* is between the output adaptor 604 and the first planar disc surface 657*a* of the output ring 656. Fluid 712 is in a fluid chamber 710 between the inner body 704 and the interior volume 703*a* of the outer body 702. A hydraulic pressure mechanism 720 (also referred to as a hydraulic adjustment piston, hydraulic adjustment mechanism, and adjustment mechanism herein) is provided for pressurizing the fluid 712 in the fluid chamber 710, wherein the fluid 712 is pressurized to press the inner body 704 towards the output ring 656 and press the first planar disc surface 657*a* of the output ring 656 against the first clutch friction plate 708*a*. Friction between the first clutch friction plate 708*a* and the first planar disc surface 657*a* of the output ring 656 causes the outer body 702 to rotate at the same rotational velocity as the axle 611 until a rotational torque applied from the axle 611 to the gearbox 650 exceeds a predetermined torque causes the first clutch friction plate 708*a* to slide against the first planar disc surface 657*a*.

According to other aspects of the present disclosure, the apparatus 700 may include one or more of the following features. The apparatus 700 may further include a second clutch friction plate 708*b* between the second planar disc surface 657*b* of the output ring 656 and inner body 704. The apparatus 700 may further include the hydraulic pressure mechanism 720 (e.g., a hydraulic adjustment piston) mounted within a first bore 722 (also referred to as a pressure bore, a threaded bore, and a threaded first bore herein) in the outer body 702, and a first passageway 724 from the first bore 722 to the interior volume 703*a* of the outer body 702 between the inner body 704 and the outer body 702, wherein inward movement of the hydraulic adjustment piston 720 into the first bore 722 increases the pressure of the fluid 712 and outward movement of the hydraulic adjustment piston 720 out of the first bore 722 decreases the pressure of the fluid 712. The apparatus 700 may further include a pressure adjustment motor 726 coupled to the hydraulic adjustment piston 720 for adjusting the position of the hydraulic adjustment piston 720 within the pressure bore 722. The apparatus 700 may further include a gas bleed piston 728 mounted within a second bore 730 (also referred to as a bleed bore herein) in the outer body 702, and a second passageway 732 from the second bore 730 to the interior volume 703*a* of the outer body 702 between the inner body 704 and the outer body 702, wherein the gas bleed piston 728 is sealed against the second bore 730 in the outer body 702 when all gas has been removed from the fluid chamber 710. The gearbox 650 may be a strain wave gearbox. The axle 611 may be coupled to an electric motor 612.

According to another aspect of the present disclosure, a torque protection apparatus 1700 is provided. The apparatus 1700 includes a gearbox 650 having an output and an input coupled to an axle 611. An output ring 1656 is coupled to the output of the gearbox 650, the output ring 1656 having a first planar disc surface 1657*a* and a second planar disc surface 1657*b*. An outer body 1702 surrounds the gearbox 650, output ring 1656, and axle 611. An output adaptor 1604 is attached to the outer body 1702. A flexible coupling 1704 is within an interior volume 1703*a* of the outer body 1702. A first clutch friction plate 1708*a* is between the output adaptor

1604 and the first planar disc surface 1657*a* of the output ring 1656. A second clutch friction plate 1708*b* is between the second planar disc surface 1657*b* of the output ring 1656 and the flexible coupling 1704. Fluid 1712 is in a fluid chamber 1710 between the flexible coupling 1704 and the interior volume 1703*a* of the outer body 1702. A hydraulic pressure mechanism 1720 is provided for pressurizing the fluid 1712 in the fluid chamber 1710, wherein the fluid 1712 is pressurized to move the flexible coupling 1704 to press the second clutch friction plate 1708*b* against the second planar disc surface 1657*b* of the output ring 1656 and press the first planar disc surface 1657*a* of the output ring 1656 against the first clutch friction plate 1708*a*. Friction between the first clutch friction plate 1708*a* and the first planar disc surface 1657*a* of the output ring 1656 and friction between the second clutch friction plate 1708*b* and the second planar disc surface 1657*b* of the output ring 1656 causes the outer body 1702 to rotate at the same rotational velocity as the axle 611 until a rotational torque applied from the axle 611 to the gearbox 650 exceeds a predetermined torque causes the first clutch friction plate 1708*a* to slide against the first planar disc surface 1657*a* and the second clutch friction plate 1708*b* to slide against the second planar disc surface 1657*b*.

According to other aspects of the present disclosure, the apparatus 1700 may include one or more of the following features. The apparatus 1700 may further include a hydraulic adjustment piston 1720 mounted within a first bore 1722 (e.g., pressure bore) in the outer body 1702, and a first passageway 1724 from the first bore 1722 to the interior volume 1703*a* of the outer body 1702 between the inner body 1704 and the outer body 1702, wherein inward movement of the hydraulic adjustment piston 1720 into the first bore 1722 increases the pressure of the fluid 1712 and outward movement of the hydraulic adjustment piston 1720 out of the first bore 1722 decreases the pressure of the fluid 1712. The apparatus 1700 may further include a pressure adjustment motor 1726 coupled to the hydraulic adjustment piston 1720 for adjusting the position of the hydraulic adjustment piston 1720 within the pressure bore 1722. The apparatus 1700 may further include a gas bleed piston 1728 mounted within a bleed second bore 1730 (e.g., bleed bore) in the outer body 1702, and a second passageway 1732 from the second bore 1730 to the interior volume 1703*a* of the outer body 1702 between the inner body 1704 and the outer body 1702, wherein the gas bleed piston 1728 is sealed against the second bore 1730 in the outer body 1702 when all gas has been removed from the fluid chamber 1710. The gearbox 650 may be a strain wave gearbox. The axle 611 may be coupled to an electric motor 612.

BRIEF DESCRIPTION OF THE DRAWINGS

The drawing figures depict one or more implementations in accord with the present teachings, by way of example only, not by way of limitation. In the figures, like reference numerals refer to the same or similar elements shown across various other figures.

DETAILED DESCRIPTION

Figure 1:
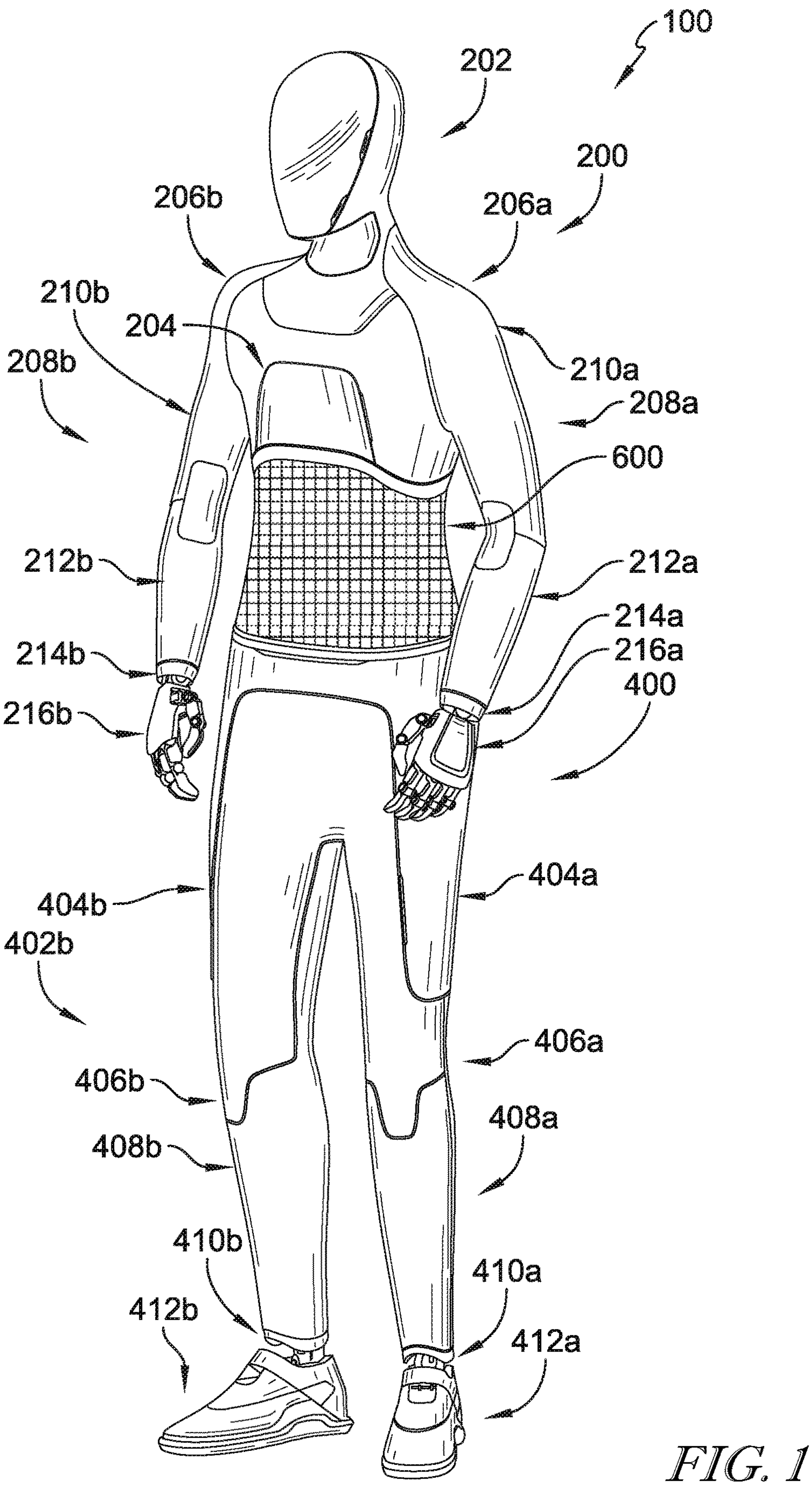
FIG. 1 is a front perspective view of a first embodiment of a humanoid robot in an upright, standing position P1 and including: (i) an upper region having the following parts: (a) a head and neck assembly, (b) a torso, (c) left and right shoulders, (d) and left and right arm assemblies each including: (e) a humerus, (f) a forearm, (g) a wrist, and (h) a hand; (ii) a lower region having left and right leg assemblies each including: (a) a thigh, (b) a knee, (c) a shin, (d) an ankle, and (e) a foot; and (iii) a central region connecting the upper portion and the lower portion to one another and configured to allow movement of the upper and lower regions relative to one another.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present disclosure.

While this disclosure includes several embodiments in many different forms, there is shown in the drawings and will herein be described in detail embodiments with the understanding that the present disclosure is to be considered as an exemplification of the principles of the disclosed methods and systems, and is not intended to limit the broad aspects of the disclosed concepts to the embodiments illustrated. As will be realized, the disclosed methods and systems are capable of other and different configurations and several details are capable of being modified all without departing from the scope of the disclosed methods and systems. For example, one or more of the following embodiments, in part or whole, may be combined consistent with the disclosed methods and systems. As such, one or more steps from the flow charts or components in the Figures may be selectively omitted and/or combined consistent with the disclosed methods and systems. Additionally, one or more steps from the flow charts or the method of assembling the shoulder and upper arm may be performed in a different order. Accordingly, the drawings, flow charts and detailed description are to be regarded as illustrative in nature, not restrictive or limiting.

1. Introduction

The present invention can have various advantages over other torque protection systems. For example, the inventive apparatus is more compact and lightweight than many other protection apparatus designs. The break-away slip torque for the clutch can be easily set from outside the structure so that the apparatus does not need to be disassembled and reassembled to adjust the slip torque. It is also possible for the clutch slip torque setting to be dynamically adjusted during operation using a pressure adjustment motor that can be used to rotate the threaded adjustment mechanism. While the motor, gearbox, and clutch are all rotating, the pressure adjustment motor can rotate the threaded adjustment mechanism into the outer body to increase the break-away slip torque or rotate the threaded hydraulic adjustment piston out of the outer body to decrease the break-away slip torque.

2. Robot Overview

The humanoid robot 100 is designed to have a substantial similarities in form factor and anatomy to human beings including many of the same major appendages that human beings have. The humanoid robot 100 includes an upper region 200, a lower region 400 spaced apart from the upper region 200, and a central region 600 interconnecting the upper region 200 and the lower region 400. The humanoid robot 100 is shown in FIG. 1 in an upright, standing position P1 where a pair of feet 410*a*, 410*b* of the lower region 400 are standing on a floor or ground surface G such that the lower region 400 supports the upper region 200 and the central region 600 above the floor.

The upper region 200 includes the following parts: (a) a head and neck assembly 202, (b) a torso 204, (c) left and right shoulders 206*a*, 206*b*, (d) and left and right arm assemblies 208*a*, 208*b* each including: (e) a humerus 210*a*, 210*b*, (f) a forearm 212*a*, 212*b*, (g) a wrist 214*a*, 214*b*, and (h) a hand 216*a*, 216*b*. The lower region 400 includes left and right leg assemblies 402*a*, 402*b* each including: (a) a thigh 404*a*, 404*b*, (b) a knee 406*a*, 406*b*, (c) a shin 408*a*, 408*b*, (d) an ankle 410*a*, 410*b*, and (e) a foot 412*a*, 412*b*. The central region 600 is located generally in, or provides, a pelvis region 601 of the humanoid robot 100. Each of the components of the upper region 200 and the lower region 400 noted above includes at least one actuator configured to move the components relative to one another. The central region 600 is also configured to allow movement of the upper and lower regions 200, 400 relative to one another in a three-dimensional manner.

Figure 2:
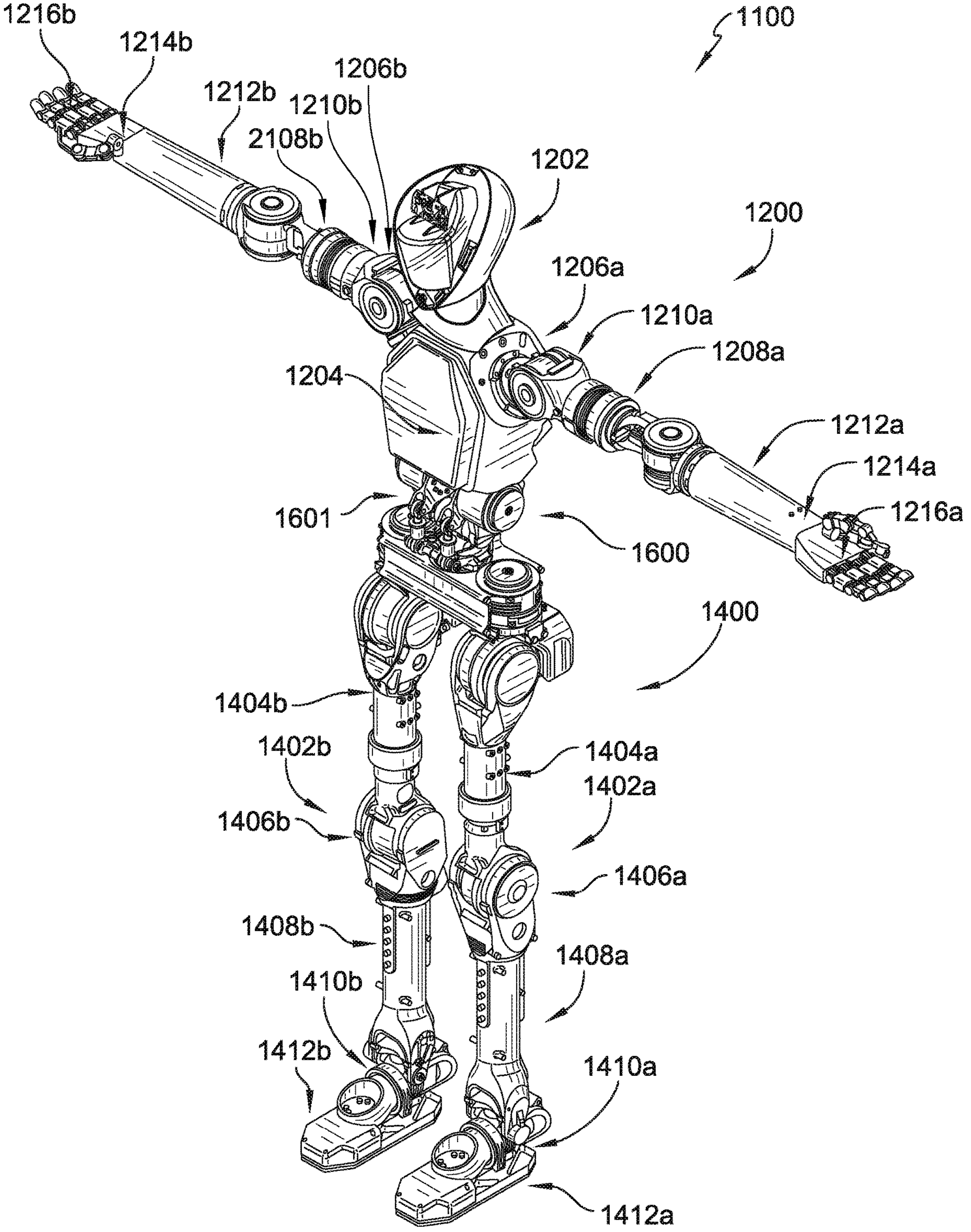
FIG. 2 is a front perspective view of a second embodiment of a humanoid robot in an upright, extended position P2.
Figure 3:
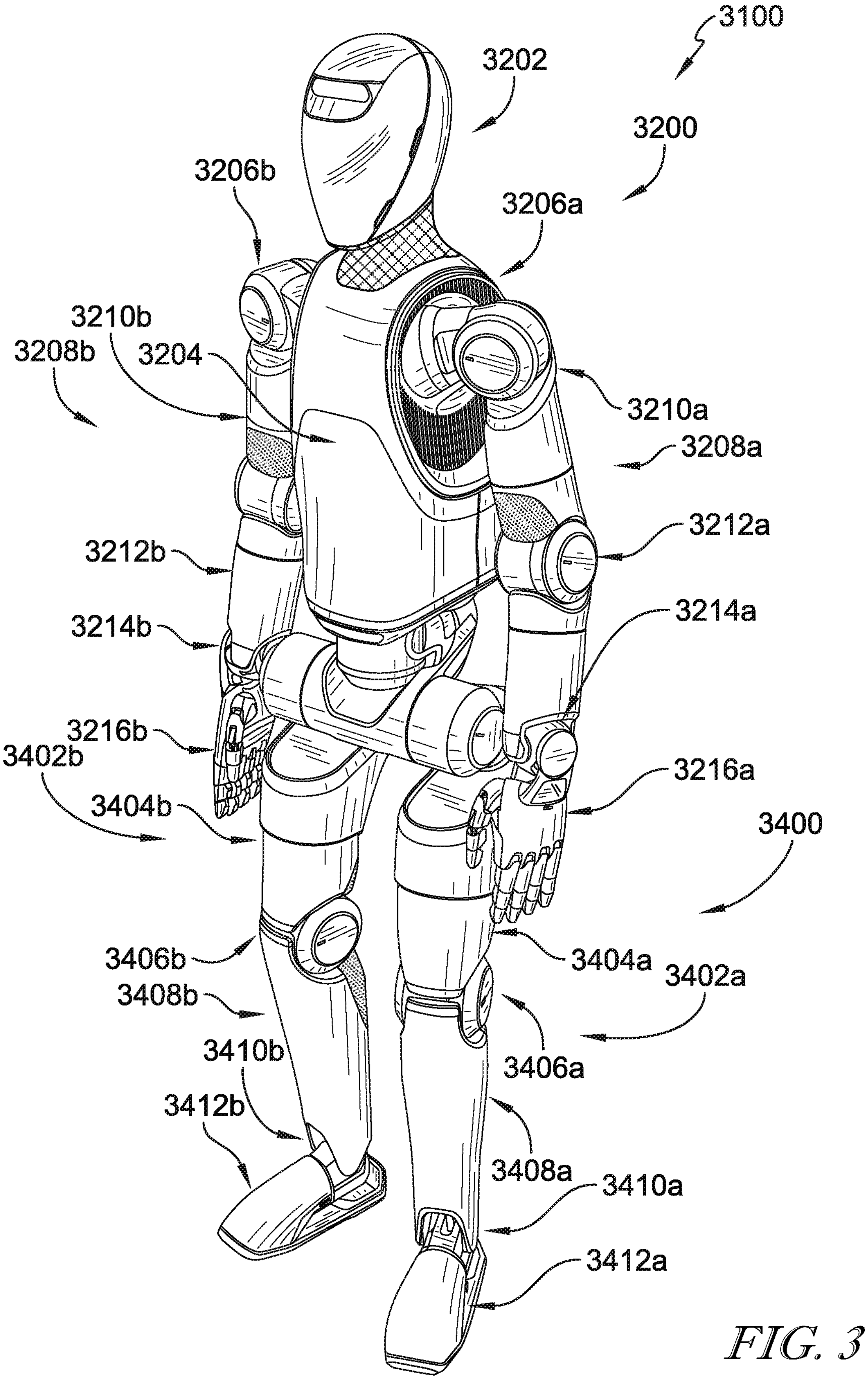
FIG. 3 is a front perspective view of a third embodiment of a humanoid robot in an upright, standing position P1.

FIGS. 2 and 3 show alternative embodiments of the humanoid robot 100. For sake of brevity, the above disclosure in connection with robot 1 will not be repeated below, but it should be understood that across embodiments like numbers represent like structures. In these embodiment, the robot 1001 and 3001 are substantially similar to the first embodiment of robot 1, but include some different features, assemblies, components, and/or parts. Some of said features, assemblies, components, and/or parts are described in the above patent applications that are incorporated herein by reference. However, it should be understood that all three embodiments of the robots 1, 1001, and 3001 include the actuator 600 shown in FIG. 4.

Figure 4:
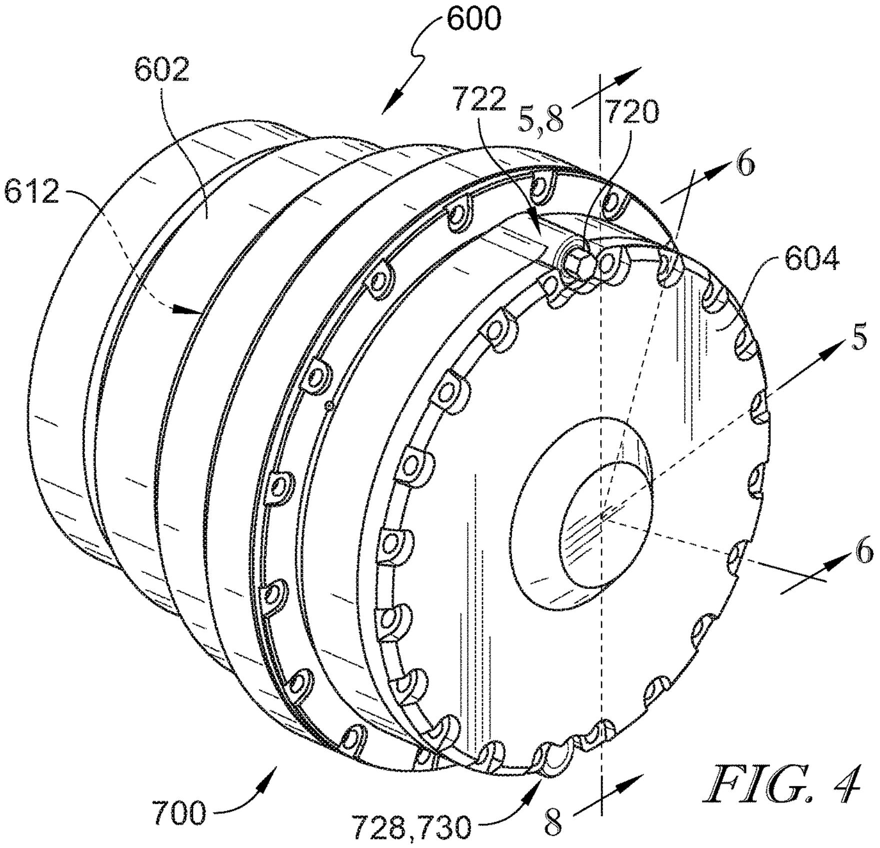
FIG. 4 is a perspective view of an actuator configured to be contained within the first, second, and third embodiments of the humanoid robot, and wherein said actuator includes a first embodiment of a clutch coupled to a gearbox.

Additionally, it should be understood that this Application contemplates the use of the actuator 600 shown in FIG. 4 in other embodiments or configurations of humanoid robots. Further, it should also be understood that the actuator 600 shown in FIG. 4 may be used in any of the following robots or robot like systems, machines, assemblies, components, and/or parts: (i) articulated robot (e.g., an arm having two, six, or ten degrees of freedom, etc.), (ii) a cartesian robot (e.g., rectilinear or gantry robots, robots having three prismatic joints, etc.), (iii) Selective Compliance Assembly Robot Arm (SCARA) robots (e.g., with a donut shaped work envelope, with two parallel joints that provide compliance in one selected plane, with rotary shafts positioned vertically, with an end effector attached to an arm, etc.), (iv) delta robots (e.g., parallel link robots with parallel joint linkages connected with a common base, having direct control of each joint over the end effector, which may be used for pick-and-place or product transfer applications, etc.), (v) polar robots (e.g., with a twisting joint connecting the arm with the base and a combination of two rotary joints and one linear joint connecting the links, having a centrally pivoting shaft and an extendable rotating arm, spherical robots, etc.), (vi) cylindrical robots (e.g., with at least one rotary joint at the base and at least one prismatic joint connecting the links, with a pivoting shaft and extendable arm that moves vertically and by sliding, with a cylindrical configuration that offers vertical and horizontal linear movement along with rotary movement about the vertical axis, etc.), (vii) quadrupeds (e.g., as described within US2022260998, which is incorporated herein by reference), (viii) self-driving car, (viii) a kitchen appliance, (ix) construction equipment, or any other type of robot or robot system.

3. Actuator

FIG. 4 includes the actuator 600 that is configured to be contained in any of the above described robots, robotic systems, and/or humanoid robots (e.g., humanoid robots shown in FIGS. 1, 2, and 3). The actuator 600 includes: (i) exterior housing 602, (ii) an output adaptor 604, (iii) mounting plate 606, (iv) bearing 608, (v) motor output coupler 610, (vi) gearbox 650, and (vii) clutch 700. The exterior housing 602 may act as a heat skink and can include projects that facilitate the mounting of the actuator within the robot 1, 1001, 3001. Additionally, the output adaptor 604 is configured to be coupled to the next or adjacent component in the robot 1, 1001, 3001. This coupling between the output adaptor 604 and the next or adjacent component enables the actuator 600 to move said next or adjacent robot component. It should be understood that the housing 602 and/or the output adaptor 604 can act as an exterior housing or exterior component of the robot 1, 1001, 3001. In other words, the housing or adaptor 602, 604 may be exposed and viewable from the exterior of the robot 1, 1001, 3001. In other embodiments, the housing and adaptor 602, 604 may be hidden or concealed within an exterior shell or cover.

The bearing 608 may be a cross-roller bearing. Said cross-roller bearing may include bearing housings constructed using advanced materials like carbon-fiber-reinforced polymers (CFRPs), fiberglass-reinforced polymers (FRPs), metal alloys, polyetheretherketone (PEEK), thermoplastic composites, and ultra-high-molecular-weight polyethylene (UHMWPE).

Additionally, the manufacturing processes for CFRPs, such as filament winding or automated fiber placement, allow for precise control over fiber orientation, further optimizing the mechanical performance of the housings. The bearings themselves can be fabricated from, include, or processed using high-grade steel alloys (e.g., AISI 52100, M50, or 440C stainless steel), high-performance nickel-based superalloys (e.g., Inconel 718 or Hastelloy), cobalt-based alloys (e.g., Stellite), advanced ceramics (e.g., alumina or zirconia-based composites), and polymer matrix composites reinforced with carbon or aramid fibers. These materials may also benefit from advanced heat treatments (e.g., vacuum hardening or cryogenic treatment), surface engineering processes (e.g., ion implantation or physical vapor deposition), or specialized coatings.

To further optimize performance, the rolling elements of the bearings may be composed of advanced ceramic materials (e.g., silicon nitride, tungsten carbide, or zirconia), sapphire, or composite materials combining ceramic with metal or polymer matrices. In another embodiment, the assembly may incorporate cylindrical roller bearings, angular contact ball bearings, or hybrid bearings that combine steel races with ceramic rolling elements. Additionally, spherical roller bearings, tapered roller bearings, needle roller bearings, magnetic bearings, or hybrid or combinations thereof. Cutting-edge manufacturing techniques, including additive manufacturing methods like selective laser melting (SLM), could be employed to create complex bearing geometries. These geometries may integrate features such as internal cooling channels, lubrication reservoirs, or textured surfaces to enhance lubrication retention and minimize wear.

The incorporation of such features allows for improved thermal management, reduced friction, and consistent lubrication distribution, even under challenging operating conditions. Additive manufacturing also enables the production of customized bearing designs with minimal material waste, aligning with sustainable manufacturing practices. In addition to additive manufacturing, other advanced processes like precision machining, laser hardening, or chemical vapor deposition (CVD) coatings may be applied to enhance the surface properties of the bearings. These techniques can improve wear resistance, reduce friction, and provide protection against corrosion, further extending the operational life of the components. The integration of smart sensors within the bearing housing is another potential enhancement, allowing for real-time monitoring of parameters such as temperature, vibration, and load. This data can be used to predict maintenance needs and prevent unexpected failures, ensuring optimal performance and reliability in critical applications.

The actuator 600 may include a motor 612 that is coupled to the motor output 610, and wherein said motor output 610 is coupled to an extent of the gearbox 650. The motor 612 may be or may include any type of advanced motor, including but not limited to, brushless DC motors, stepper motors, servo motors, coreless DC motors, synchronous AC motors, asynchronous induction motors, linear motors, piezoelectric motors, direct-drive motors, switched reluctance motors, permanent magnet synchronous motors (PMSMs), axial flux motors, and hybrid stepper motors. These motors may employ rare-earth permanent magnets, such as neodymium-iron-boron (NdFeB) alloys, samarium-cobalt (SmCo) magnets, ferrite magnets, alnico magnets, flexible magnets, bonded rare-earth magnets, and high-temperature permanent magnets, to achieve high torque density and energy efficiency. Motor windings may include high-conductivity copper wire with advanced ceramic or polyimide insulation for superior thermal and electrical performance.

Additionally, to achieve exceptional positional accuracy and ensure reliable operation, each motor may be equipped with advanced encoders, which could be optical, magnetic, capacitive, inductive, resistive, piezoelectric, hall-effect, potentiometric, or ultrasonic. These encoders may facilitate sub-millimeter-level accuracy, critical for applications requiring meticulous movement control. To complement positional data, said actuator may include integrated torque sensors that have strain gauges, piezoresistive sensors, magnetoelastic sensors, capacitive sensors, fiber-optic sensors, or rotary transformers. Additionally or alternatively, the actuators may include current sensors, such as Hall-effect sensors, shunt resistors, fluxgate sensors, Rogowski coils, or magnetoresistive sensors. Furthermore, the system may incorporate micro-electromechanical systems (MEMS) gyroscopes and/or accelerometers, which provide additional sensory data related to orientation, angular velocity, and linear acceleration. This sensory integration enhances the robot's ability to navigate complex environments and maintain stability during operation.

a. Gearbox

The gearbox 650 is designed to reduce the rotational velocity of the motor output 610 to enable the output of the gearbox to have a slower rotational velocity than the motor output 610. The gearbox may be a strain wave gearbox (e.g., Harmonic Drive), cycloidal reducers, planetary gearboxes, bevel gear systems, parallel shaft helical gear mechanisms, spur gear assemblies, crossed helical gear systems, herringbone gears, hypoid gears, bevel hypoid gears, epicyclic gear trains, and differential gear systems. Additionally, some implementations may incorporate custom gear profiles optimized for torque transfer efficiency, backlash reduction, and noise minimization. The gearbox 650 along with the remaining components of the actuator can provide reduction ratios in the range of 1:50 to 1:1000, and preferably 1:50 to 1:200.

The strain wave gearbox 650 that is shown in the Figure includes: (i) a wave generator 652 coupled to the motor output 610, (ii) a flexspline 654 or geared circular cup 654, (iii) a circular spline 656, and (iv) bearings 658. The axle 611 can rotate the wave generator 652 which can have an elliptical disc shape. The bearings 658 are placed around the outer surface of the wave generator 652. The bearings 658 around the outer surfaces of the wave generator 652 allow the for smooth low friction rotation of the wave generator 652 within the flexspline 654. As described above, the bearings 658 may be any bearing that is known in the art or disclosed herein, or may include any part or component of a bearing disclosed herein.

The flexspline 654 has outer teeth that mesh with the inner teach on the inner cylindrical surface of the output ring 656. The flexspline 654 can be shaped like a cup. The side walls *655a* of the flexspline 654 are thin, but the bottom is rigid *655b*. The walls *655a* at the open end can be very flexible while the closed side can be rigid and coupled to the axle. The teeth are positioned radially around the outer surface of the flexspline 654. The flexspline 654 fits tightly over the wave generator 652 and bearings 658, so that when the wave generator 652 is rotated, the flexspline 654 deforms to the shape of a rotating ellipse. The bearing 658 lets the flexspline 654 rotate independently to the wave generator 652.

The circular spline 656 is a rigid circular ring with teeth on the inner cylindrical surface. The flexspline 654 and wave generator 652 are placed inside the circular spline 656 with the outer teeth of the flexspline 654 meshing with the inner teeth of the circular spline 656. Because the flexspline 654 is deformed into an elliptical shape, the teeth of the flexspline 654 only mesh with the teeth of the circular spline 656 in two regions on opposite sides of the flexspline 654 on the major axis of the ellipse that are furthest from the center axle. The teeth of the flexspline 654 that are not at the two furthest regions from the center axle on opposite sides of the flexspline 654 do not mesh with the adjacent teeth of the circular spline 656.

The wave generator 652 can be coupled to the motor output 610. When the motor output 610 and wave generator 652 rotate, the flexspline teeth which are meshed with the inner teeth of the circular spline 656 slowly change position. The major axis of the flexspline 654's ellipse rotates with wave generator 652, so the points where the teeth mesh revolve around the center point at the same rate as the wave generator 652's shaft. There are fewer outer teeth on the flexspline 654 than there are inner teeth on the circular spline 656. Thus, for every full rotation of the wave generator 652, the flexspline 654 would be required to rotate a slight amount backward relative to the circular spline 656. Thus, the rotation action of the wave generator 652 results in a much slower rotation of the flexspline 654. In the illustrated embodiment, the flexspline 654 can have 60 teeth and the circular spline 656 can have 62 teeth. Because the flexspline 654 has 2 few teeth than the circular spline 656, the flexspline 654 will rotate 2 teeth or −11 degrees for each full rotation of the wave generator 652.

b. Clutch

FIG. 4 illustrates an upper portion (e.g., ¼) of a first embodiment a clutch 700. The clutch 700 includes: (i) an outer body 702, (ii) an inner body 704, (iii) at least one clutch plate 706, (iv) a fluid chamber 710, (v) fluid 712, (vi) seals 716, and an adjustment mechanism 720. The output ring 656 of the gearbox or circular spline 656 transmits power to the clutch 700 that prevents torque above a predetermined value from being transmitted to the outer body 702 to protect the gearbox 650 and components connected to the outer body 702.

The outer body 702 may have a complex geometry that is configured to abut: (i) the bearing 608, (ii) the inner body 704, and (iii) the output ring 656 of the gearbox 650. Said outer body 702 includes: (i) a receiver **703*a* that is designed to receive a fluid 712 and an extent of the inner body 704, and (ii) projections 703*b*. The receiver 703*a* has a wedged shaped configuration with: (i) a lower surface that is designed to abut the inner body 704 and one of the seals 716, (ii) a rear surface that is designed to form the rear wall of the fluid chamber 710, (iii) an upper surface that is designed to abut the other seal 716. The outer body 702 also includes a channel that is fluid communication with the adjustment mechanism 720. To enable this fluid communication, the outer body 702 is designed to receive an extent of the adjustment mechanism 720. In particular, the outer body 702 may include a threaded extent that is designed to receive a threaded extent of the adjustment mechanism 720**.

The inner body 704 can be positioned within the outer body 702 and includes: (i) a plurality of sealing receivers **705*a*, and (ii) a plurality of teeth 705*b*. The plurality of sealing receivers or grooves 705*a* include a top sealing receiver or groove that is designed to receive an extent of a top or upper seal and a bottom sealing receiver or groove is designed to receive an extent of a bottom or lower seal. It should be understood that additional or fewer seals may be used. The plurality of teeth 705*b* of the inner body 704 are configured to be positioned adjacent to or interact with the projections 703*b* of the outer body 702. Said interaction between the teeth 705*b* and projections 703*b* allows for the transfer of energy between the inner body 704 and outer body 702**. It should be understood that other methods of transferring energy between these adjacent components may be used.

The fluid chamber 714 can be formed between: (i) the rear surfaces of the inner body 704, (ii) inner surfaces of the outer body 702, (iii) the seals 716, (iv) the channel formed in the outer body 702, and (v) a rear extent of the adjustment mechanism 720. Said fluid chamber 714 is designed to be filed with a fluid 712. The fluid may be any known fluid.

The adjustment mechanism 720 can be coupled to the outer body 702 and designed to adjust and control the pressure applied by the inner body 704 on the clutch plate 706, **708*b*, which in controls the pressure applied on the output ring 656. In the illustrated embodiment, the adjustment mechanism 720 has external threads and is designed to be threaded into a first bore 722 in the outer body 702, wherein said outer body 702 includes cooperatively dimensioned internal threads. An inner portion of the adjustment mechanism 720 has one or more o-rings or seals that slide against a smooth inner diameter of the first bore 722 in the outer body 702. The first bore 722 is filled with fluid 712 positioned within the fluid chamber 714 with, by an internal passageway or channel (e.g., first passageway). The fluid 712 pressure within the fluid chamber 714 can be increased by screwing the adjustment mechanism 720 into the threaded first bore 722 in the outer body 702. The movement of the adjustment mechanism 720 into the outer body 702 reduces the total volume of the fluid chamber 714 and internal passageways which increases the pressure within said fluid chamber 714. Conversely, the fluid [712] pressure (P) can be decreased by screwing the adjustment mechanism 720 out of the threaded bore 722 in the outer body 702. The movement of the adjustment mechanism 720 out of the outer body 702 increases the total volume of the fluid chamber 714 and internal passageways which decreases the pressure. Because the fluid 712 is incompressible liquid, a small movement of the adjustment mechanism 720 into or out of the outer body 702 can result in a significant change in fluid pressure. In some embodiments, a pressure gage can be coupled to the fluid chamber 714** or a connected internal passageway so that the pressure can be detected and measured.

The output ring 656 can have a disc configuration with planar surfaces that are positioned between at least one clutch plate 706. The output ring 656 is configured to be compressed between clutch plates 706 so that there is normally no relative movement between the output ring 656 and the clutch friction plates 706. Because said output ring 656 is fixed between the clutch friction plates 706 in this normal state, the outer body 702 of the clutch 700 and the output adaptor 604 will rotate at the same rotational velocity as the output ring 656. In this embodiment, a first clutch friction plate **708*a* can be placed between the output adaptor 604 and a first planar surface of the gearbox output ring 656. Due to the position, said first clutch friction plate 708*a* is fixed in place. A second clutch friction plate 708*b* is placed between a second planar surface of the gearbox output ring 656 and the inner body 704. The second clutch friction plate 708*b* is configured to slide axially within the outer body 702. Said movement of the second clutch friction plate 708*b* can be outward, away from the motor, or towards the output adaptor 604, when the fluid 712 within the fluid chamber 710 forces the inner body 704 towards outward, away from the motor, or towards the output adaptor 604. In some instances, the clutch friction plate 708*b* may slightly deform or slide inward, towards the motor, or away from the output adaptor 604, when the torque of the motor assembly exceeds a clutch breakaway torque value. In an alternative embodiment, the first clutch friction plate 708*a*** may be omitted.

The clutch 700 provides a torque protection system to protect the gearbox 650 and devices coupled to the output adapter 604 from being exposed to forces that can break or damage the coupled devices. The clutch 700 can normally transmit the full torque power that the motor assembly applies to the axle through the gearbox 650 to the clutch 700. In this normal state, the motor assembly does not exceed a clutch breakaway torque value. In this state, the fluid 712 pushes the inner body 704 towards the clutch friction plate 708*b* and the output ring 656. The outwardly directed force that is applied on the inner body 704 causes a clamping force to be applied between the clutch friction plates 706. Said clamping force applies pressure against the output ring 656 to create enough friction to lock the output ring 656 to the output adaptor 604.

When the torque of the motor assembly exceeds a clutch breakaway torque value, the friction associated with the clamping force via the clutch friction plates 706 is overcome. Wherein when said friction is overcome, the gearbox output ring 656 can slide against one or both of the clutch friction plates 706. If the torque applied to the clutch 700 is reduced below the set breakaway torque value, then the gearbox output ring 656 can stop sliding in relation to the clutch friction plates 706. This enables the outer body 702 and the output adaptor to rotate at the full rotational torque of the gearbox 650.

The clutch breakaway torque value is adjustable and can be set to prevent the motor assembly from transmitting torque above the design strength of the gearbox 650 and components attached output adapter 604. Thus, it can be important to know the design strengths of the gearbox 650 and the components attached outer body and set the clutch breakaway torque to a value that is below all of these component design strengths. The clutch breakaway torque is proportional to the pressure against the inner body 704 that controls the pressure of the clutch plates 706 against the output ring 656. A higher pressure will result in a higher breakaway torque and a lower pressure will result in a lower breakaway torque. In different embodiments, various adjustment mechanisms can be used to control the pressure of the clutch plates 706 against the output ring 656.

The break-away slip torque for the clutch 700 can be calculated based on the pressure of the fluid 712. The equation for the break-away slip torque is $ST=R\times\mu\times P\times A$, where ST is the maximum torque that is transmitted through the clutch 700, R is the effective radius of the clutch fiction plate 706 that rests against the gearbox output ring 656, $\mu$ is the coefficient of friction between the clutch friction plate 706 and the gearbox output ring 656, and A is the effective area of the inner body 704. The effective radius R is a distance related to the output ring 656 rotor and the clutch friction plate(s). The effective radius R can be determined by (1) the outer diameter of the output ring 656 rotor and (2) the width of the clutch friction plate(s) 706 contact zone on the output ring 656 rotor. In general, the effective radius R lies approximately in the middle of the clutch friction plate(s) 706 contact zone in the output ring 656 rotor. The static coefficient of friction of the clutch friction plates against the gearbox output ring 656 can be between 0.4 and 0.55 where the clutch friction plates are made of organic, ceramic, or semi-metallic materials. The clutch friction plates can be made of known brake pad materials. The gearbox output ring 656 can be made of aluminum. A higher $\mu$ number represents more friction between the friction plate and the output ring 656 and a lower $\mu$ number represents less friction between the friction plate and the output ring 656. The effective area (A) of inner body 704 can be calculated from the physical dimensions of the inner body 704. In the illustrated embodiment, the inner body 704 can be an annular structure with seals 716 that keep the fluid 712 within a designated fluid volume when the inner body 704 slides within the outer body. The effective area of inner body 704 can be $A=\pi\cdot(R_{outer}-R_{inner})^2$, where $R_{outer}$ is the radius of the o-ring on the outer diameter of the inner body 704 and $R_{inner}$ is the radius of the o-ring on an inner diameter of the inner body 704.

4. Alternative Embodiment

Figure 10:
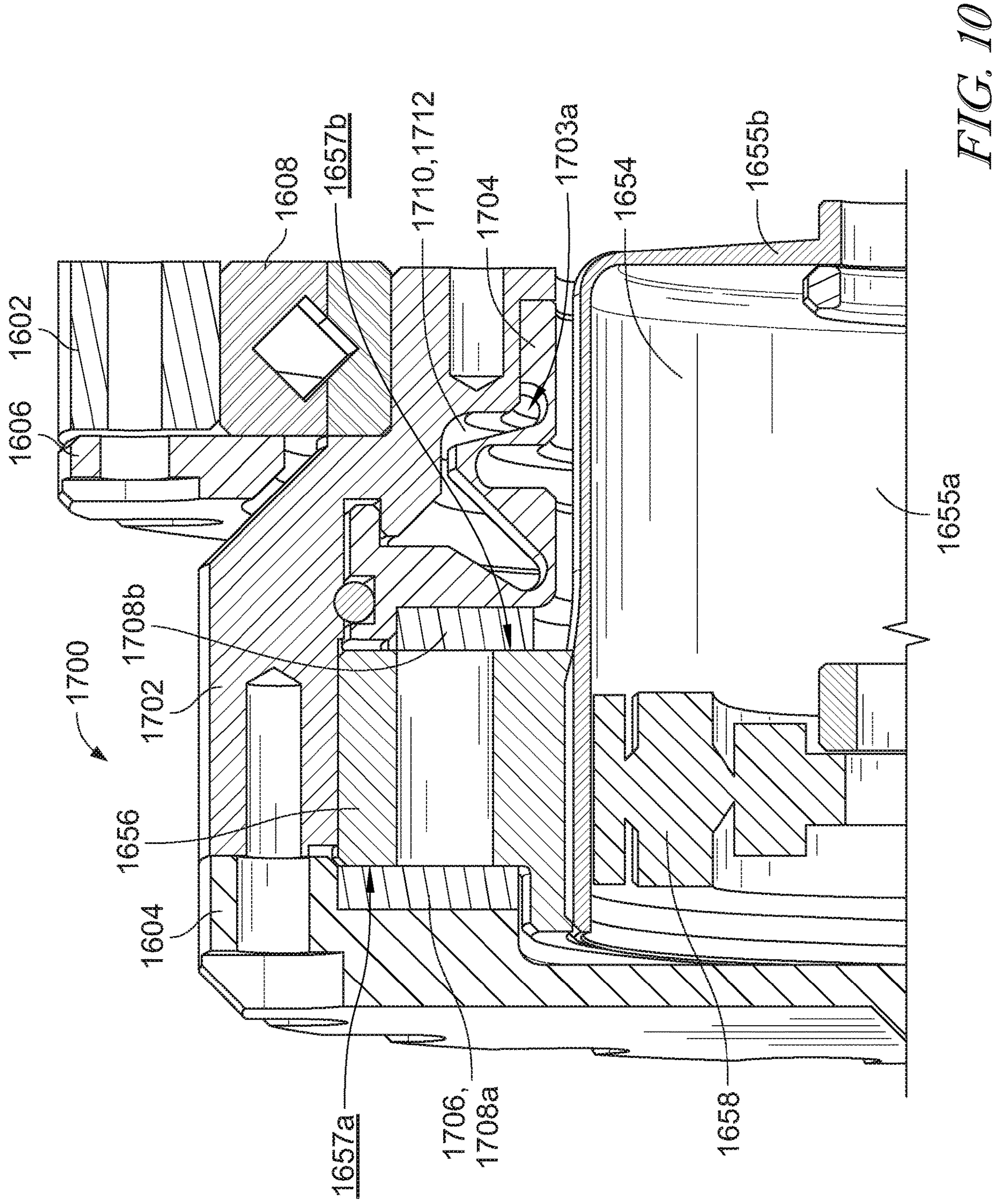
FIG. 10 is a cross-sectional view of a portion of the actuator taken along line 6-6 of FIG. 4, wherein said actuator includes a second embodiment of a clutch coupled to the gearbox.

FIG. 10 illustrates a gearbox and clutch assembly that uses a different clutch. The illustrated clutch can include a hydraulic outer body 1702, an output adaptor, clutch plates 1706, the gearbox output ring 1656, a flexible coupling, an o-ring seal, fluid 1712, and an adjustment mechanism 1720. The output ring 1656 can be a disc having planar surfaces that are positioned between clutch plates 1706. The first clutch friction plate can be placed between the output adaptor and the first planar surface of the gearbox output ring 1656 and the second clutch friction plate can be placed between the second planar surface of the gearbox output ring 1656 and the inner body 1704. The flexible coupling can be mounted within the hydraulic outer body 1702 with an o-ring seal in an o-ring groove on an outer diameter of the flexible coupling and a portion at an opposite end of the flexible coupling can be bonded to the outer body forming a fluid tight seal and a mechanical coupling that can transmit torque. A fluid 1712 volume can be created by a space between the flexible coupling and inner surfaces of the hydraulic outer body 1702. The adjustment mechanism 1720 can be coupled to the fluid 1712 volume to control the hydraulic pressure and the force applied between the clutch plates 1706 and the gearbox output ring 1656. The hydraulic pressure does not cause the flexible coupling to expand inward to contact the flexible coupling.

Figure 5:
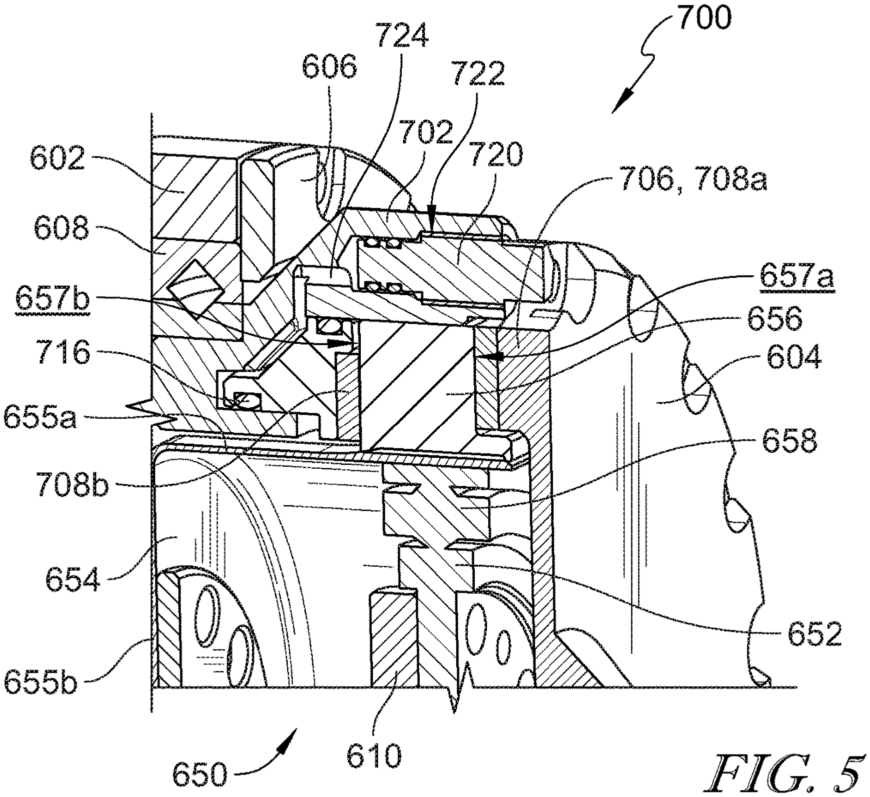
FIG. 5 is a perspective cross-sectional view of the portion of the actuator taken along line 5-5 of FIG. 4, and wherein the clutch includes an outer body, an inner body, at least one clutch plate, and an adjustment mechanism.
Figure 6:
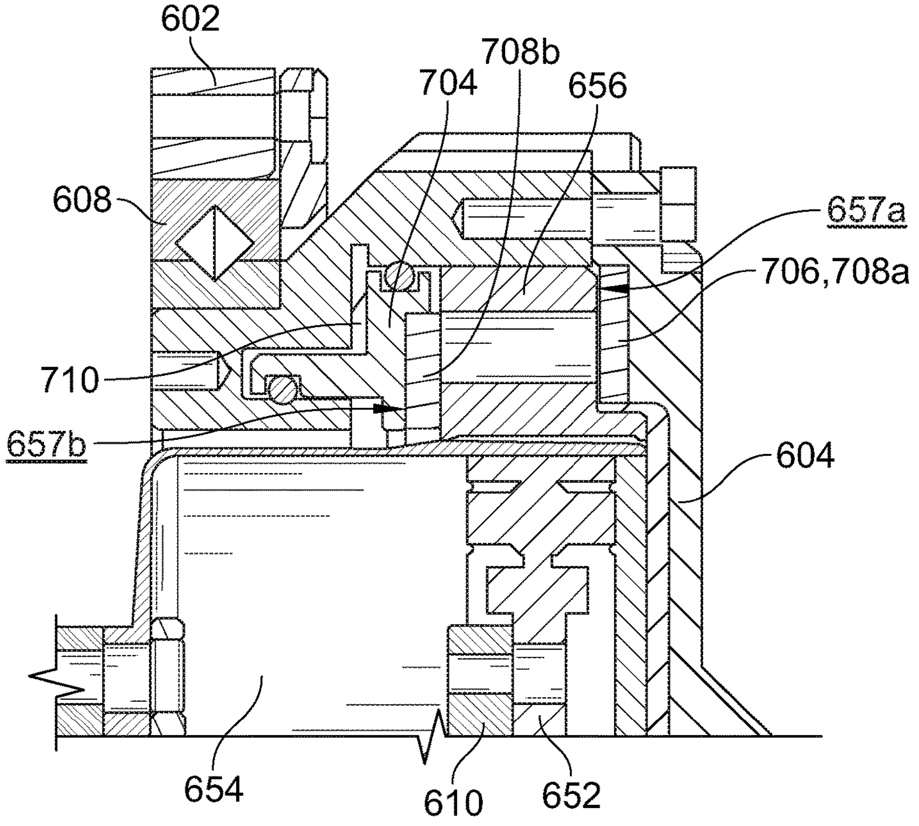
FIG. 6 is a cross-sectional view of the portion of the actuator taken along line 6-6 line of FIG. 4, and showing a first extent of the inner body of the clutch.
Figure 7:
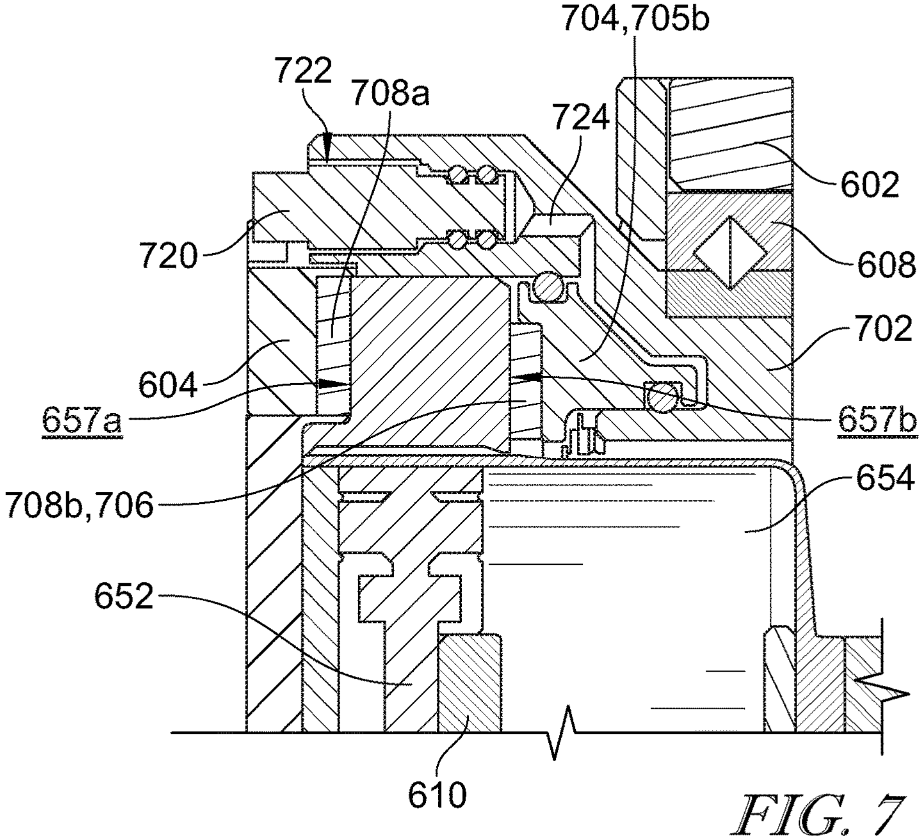
FIG. 7 is a cross-sectional view of the portion of the actuator taken along line 5-5 of FIG. 4, and showing a second extent of the inner body of the clutch and the adjustment mechanism.
Figure 9:
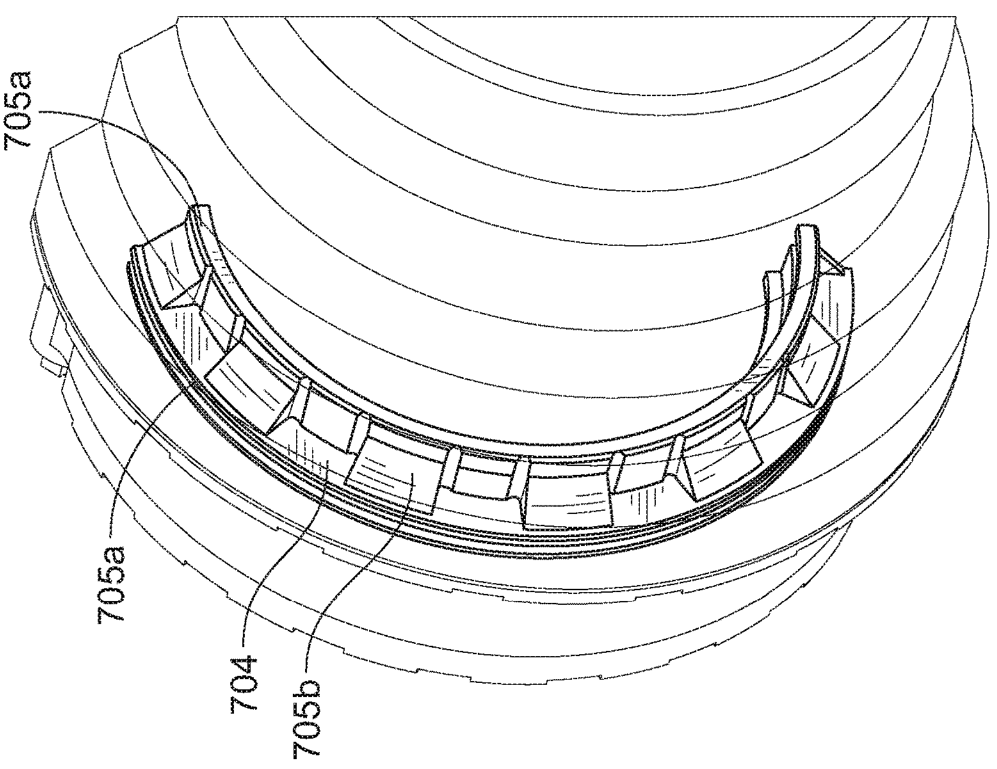
FIG. 9 is a simi-transparent rear perspective view of the actuator of FIG. 4, and wherein the inner body of the clutch is highlighted.
Figure 8:
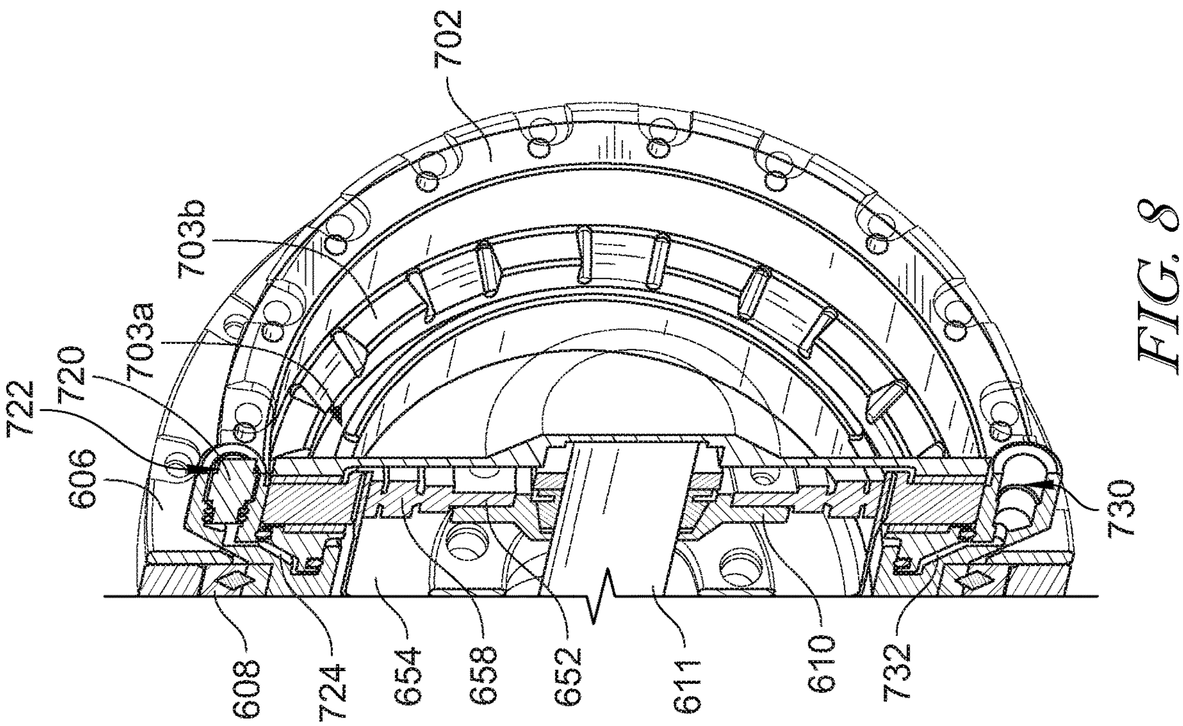
FIG. 8 is a simi-transparent cross-sectional view of a portion of the actuator taken along line 8-8 of FIG. 4, and wherein the outer body of the clutch is highlighted.

One of the clutch friction plates can be adjacent to an output adaptor coupled to an end portion. The outer body and a second clutch friction plate can be against the flexible coupling that can move axially within the outer body. The output ring 1656 can normally be compressed between clutch plates 1706 so that there is normally no relative movement between the output ring 1656 and the clutch friction plates and the outer body of the clutch will rotate at the same rotational velocity as the output ring 1656 and the output of the gearbox. The outer body of the clutch can be coupled to an output device that can be rotated by the outer body. In this embodiment, when the break-away slip torque is exceeded, both the output adaptor and the flexible coupling can be fixed to, and rotate with, the outer body. Because both clutch friction plates will slide against the gearbox output ring 1656 when the break-away slip torque is exceeded, the slip torque equation for the embodiment illustrated in FIG. 5 will be different than the slip torque equation for the embodiment illustrated in FIG. 4.

For the embodiment illustrated in FIG. 10, the equation for the break-away slip torque is $ST=\mu P\cdot((R\times A)_{friction\ plate\ 1}+(R\times A)_{friction\ plate\ 2})$, where ST is the maximum torque that is transmitted through the clutch, $\mu$ is the coefficient of friction between the clutch fiction plates and the gearbox output ring 656, P is the fluid 712 pressure, R is the effective radius of the clutch fiction plate that rests against the output adaptor, and A is the effective area of the inner body 1704. Note that there are different R and A values for each of the friction plates. Because the break-away slip torque will be higher for this clutch configuration if both are set at the same hydraulic pressure, the fluid 1712 pressure P can be substantially lower for the same slip torque setting for the FIG. 10 clutch embodiment.

It can be important to set up the clutch to a break-away slip torque that is below the maximum torque rating of the connected system components. For example, if the gearbox has a maximum torque rating of 300 Nm (newton meters), the hydraulic pressure can be adjusted so that the break-away slip torque of the clutch can be set to a safe value below 300 Nm such as 250-280 Nm to ensure that the gearbox does not reach its maximum torque rating. In some embodiments, a pressure gauge can be coupled to the fluid 1712 volume and the hydraulic pressure mechanism can be adjusted so that the hydraulic pressure desired break-away slip torque. If this gearbox torque exceeds the break-away slip torque the gearbox output ring 656 can rotate between the clutch friction plates within the outer body to prevent overload torque from being transmitted to the gearbox.

5. Industrial Application

While the disclosure shows illustrative embodiments of a robot (in particular, a humanoid robot), it should be understood that embodiments are designed to be examples of the principles of the disclosed assemblies, methods and systems, and are not intended to limit the broad aspects of the disclosed concepts to the embodiments illustrated. As will be realized, the disclosed robot, and its functionality and methods of operation, are capable of other and different configurations and several details are capable of being modified all without departing from the scope of the disclosed methods and systems. For example, one or more of the disclosed embodiments, in part or whole, may be combined with a disclosed assembly, method and system. As such, one or more steps from the diagrams or components in the Figures may be selectively omitted and/or combined consistent with the disclosed assemblies, methods and systems. Additionally, one or more steps from the arrangement of components may be omitted or performed in a different order. Accordingly, the drawings, diagrams, and detailed description are to be regarded as illustrative in nature, not restrictive or limiting, of the said humanoid robot.

It is to be understood that the invention is not limited to the exact details of construction, operation, exact materials or embodiments shown and described, as obvious modifications and equivalents will be apparent to one skilled in the art. While the specific embodiments have been illustrated and described, numerous modifications come to mind without significantly departing from the spirit of the invention, and the scope of protection is only limited by the scope of the accompanying Claims. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

It should also be understood that substantially utilized herein means a deviation less than 15% and preferably less than 5%. It should also be understood that other configuration or arrangements of the above-described components is contemplated by this Application. Moreover, the description provided in the background section should not be assumed to be prior art merely because it is mentioned in or associated with the background section. The background section may include information that describes one or more aspects of the subject of the technology. Finally, the mere fact that something is described as conventional does not mean that the Applicant admits it is prior art.

In this Application, to the extent any U.S. patents, U.S. patent applications, or other materials (e.g., articles) have been incorporated by reference, the text of such materials is only incorporated by reference to the extent that they do not conflict with materials, statements and drawings set forth herein. In the event of such conflict, the text of the present document controls, and terms in this document should not be given a narrower reading in virtue of the way in which those terms are used in other materials incorporated by reference. It should also be understood that structures and/or features not directly associated with a robot cannot be adopted or implemented into the disclosed humanoid robot without careful analysis and verification of the complex realities of designing, testing, manufacturing, and certifying a robot for completion of usable work nearby and/or around humans. Theoretical designs that attempt to implement such modifications from non-robotic structures and/or features are insufficient (and in some instances, woefully insufficient) because they amount to mere design exercises that are not tethered to the complex realities of successfully designing, manufacturing and testing a robot.

What is claimed is:

1. A torque protection apparatus, comprising:

a gearbox having an output and an input coupled to an axle;

an output ring coupled to the output of the gearbox, the output ring having a first planar disc surface and a second planar disc surface;

an outer body surrounding the gearbox, output ring, and axle;

an output adaptor attached to the outer body;

an inner body within an interior volume of the outer body;

a first clutch friction plate between the output adaptor and the first planar disc surface of the output ring;

a fluid in a fluid chamber between the inner body and the interior volume of the outer body; and a hydraulic pressure mechanism for pressurizing the fluid in the fluid chamber, wherein the fluid is pressurized to press the inner body towards the output ring and press the first planar disc surface of the output ring against the first clutch friction plate;

wherein friction between the first clutch friction plate and the first planar disc surface of the output ring causes the outer body to rotate at the same rotational velocity as the axle until a rotational torque applied from the axle to the gearbox exceeds a predetermined torque causes the first clutch friction plate to slide against the first planar disc surface.

2. The apparatus of claim 1, further comprising a second clutch friction plate between the second planar disc surface of the output ring and the inner body.

3. The apparatus of claim 2, wherein the first clutch friction plate is fixed in place, and wherein the second clutch friction plate is configured to slide axially within the outer body.

4. The apparatus of claim 1, further comprising:

a first bore in the outer body; and a first passageway from the first bore to the interior volume of the outer body between the inner body and the outer body;

wherein the hydraulic pressure mechanism is mounted within the first bore, and inward movement of the hydraulic pressure mechanism into the first bore increases the pressure of the fluid and outward movement of the hydraulic pressure mechanism out of the first bore decreases the pressure of the fluid.

5. The apparatus of claim 4, further comprising:

a gas bleed piston mounted within a second bore in the outer body; and a second passageway from the second bore to the interior volume of the outer body between the inner body and the outer body;

wherein the gas bleed piston is sealed against the second bore in the outer body when all gas has been removed from the fluid chamber.

6. The apparatus of claim 1 wherein the gearbox is a strain wave gearbox.

7. The apparatus of claim 1 wherein the axle is coupled to an electric motor.

8. The apparatus of claim 1, wherein the predetermined torque is less than a maximum torque rating of the gearbox.

9. The apparatus of claim 1, wherein the predetermined torque is adjustable from outside the apparatus without disassembly of the apparatus.

10. The apparatus of claim 1, wherein the first clutch friction plate is made of a ceramic material or a semi-metallic material.

11. The apparatus of claim 1, wherein a static coefficient of friction between the first clutch friction plate and the first planar disc surface of the output ring is between 0.4 and 0.55.

12. A torque protection apparatus, comprising:

a gearbox having an output and an input coupled to an axle;

an output ring coupled to the output of the gearbox, the output ring having a first planar disc surface and a second planar disc surface;

an outer body surrounding the gearbox, output ring, and axle;

an output adaptor attached to the outer body;

a flexible coupling within an interior volume of the outer body;

a first clutch friction plate between the output adaptor and the first planar disc surface of the output ring;

a second clutch friction plate between the second planar disc surface of the output ring and the flexible coupling;

a fluid in a fluid chamber between the flexible coupling and the interior volume of the outer body; and a hydraulic pressure mechanism for pressurizing the fluid in the fluid chamber, wherein the fluid is pressurized to move the flexible coupling to press the second clutch friction plate against the second planar disc surface of the output ring and press the first planar disc surface of the output ring against the first clutch friction plate;

wherein friction between the first clutch friction plate and the first planar disc surface of the output ring and friction between the second clutch friction plate and the second planar disc surface of the output ring causes the outer body to rotate at the same rotational velocity as the axle until a rotational torque applied from the axle to the gearbox exceeds a predetermined torque causes the first clutch friction plate to slide against the first planar disc surface and the second clutch friction plate to slide against the second planar disc surface.

13. The apparatus of claim 12, further comprising:

a first bore in the outer body; and a first passageway from the first bore to the interior volume of the outer body between the flexible coupling and the outer body; and wherein the hydraulic pressure mechanism is mounted within the first bore, and inward movement of the hydraulic pressure mechanism into the first bore increases the pressure of the fluid and outward movement of the hydraulic pressure mechanism out of the first bore decreases the pressure of the fluid.

14. The apparatus of claim 12, further comprising:

a gas bleed piston mounted within a second bore in the outer body; and a second passageway from the second bore to the interior volume of the outer body between the flexible coupling and the outer body;

wherein the gas bleed piston is sealed against the second bore in the outer body when all gas has been removed from the fluid chamber.

15. The apparatus of claim 12 wherein the gearbox is a strain wave gearbox.

16. The apparatus of claim 12 wherein the axle is coupled to an electric motor.

17. The apparatus of claim 12, wherein the predetermined torque is less than a maximum torque rating of the gearbox.

18. The apparatus of claim 12, wherein the predetermined torque is adjustable from outside the apparatus without disassembly of the apparatus.

19. The apparatus of claim 12, further comprising a pressure gauge coupled to the fluid chamber, the pressure gauge configured to measure a pressure of the fluid in the fluid chamber.

20. The apparatus of claim 12, wherein a static coefficient of friction between each of the first clutch friction plate and the second clutch friction plate and the output ring is between 0.4 and 0.55.

* * * * *